US012439334B2

(12) United States Patent
Awadin et al.

(10) Patent No.: US 12,439,334 B2
(45) Date of Patent: Oct. 7, 2025

(54) REDUCING POWER CONSUMPTION FOR MBS UEs

(71) Applicant: Samsung Electronics Co., Ltd., Suwon-si (KR)

(72) Inventors: Mohamed Mokhtar Gaber Moursi Awadin, Plymouth Meeting, PA (US); Jung Hyun Bae, San Diego, CA (US); Philippe Jean Marc Michel Sartori, Naperville, IL (US); Liang Hu, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 422 days.

(21) Appl. No.: 17/665,488

(22) Filed: Feb. 4, 2022

(65) Prior Publication Data
US 2022/0303892 A1  Sep. 22, 2022

Related U.S. Application Data

(60) Provisional application No. 63/162,301, filed on Mar. 17, 2021, provisional application No. 63/161,985, filed on Mar. 16, 2021.

(51) Int. Cl.
H04W 52/02  (2009.01)
H04L 5/00  (2006.01)
(Continued)

(52) U.S. Cl.
CPC ....... *H04W 52/0216* (2013.01); *H04L 5/0092* (2013.01); *H04W 52/0229* (2013.01); *H04W 72/121* (2013.01); *H04W 72/23* (2023.01)

(58) Field of Classification Search
CPC ......... H04W 52/0216; H04W 52/0229; H04W 72/121; H04W 72/23; H04W 52/32;
(Continued)

(56) References Cited

U.S. PATENT DOCUMENTS 8,743,898 B2   6/2014  Kim et al.
10,498,507 B2  12/2019  Onggosanusi et al.
(Continued)

FOREIGN PATENT DOCUMENTS

EP  4272468 A1  11/2023
WO  WO-2021030804 A1 *  2/2021 ........... H04L 1/1671

OTHER PUBLICATIONS

CATT et al., "Discussion on Basic Fuctions for Broadcast/Multicast for RRC_IDLE/RRC_INACTIVE UEs", 3GPP Draft, R1-2007837, vol. RAN WG1, e-Meeting #103-e, 2020, 5 pages.
(Continued)

*Primary Examiner* — Dinh Nguyen
(74) *Attorney, Agent, or Firm* — Renaissance IP Law Group LLP

(57) ABSTRACT

A system and a method in a wireless communication network are disclosed to reduce a power consumption of a Multicast and Broadcast Services (MBS) device. The device includes an interface to the wireless communication network that receives wireless communications from the wireless communication network, and a controller. The controller controls the interface to receive unicast communications in a bandwidth part (BWP) of the wireless communication network and to receive MBS communications in a common frequency resource (CFR) of the wireless communications. The controller further controls the interface by selectively receiving MBS communications in the CFR to reduce a frequency bandwidth of the interface, or a combination thereof, to reduce a power consumption of the device.

18 Claims, 18 Drawing Sheets

(51) Int. Cl.
*H04W 72/121* (2023.01)
*H04W 72/23* (2023.01)

(58) Field of Classification Search
CPC ........... H04W 52/143; H04W 72/0453; H04W 52/0261; H04W 4/06; H04W 52/0212; H04W 72/30; H04L 5/0092; Y02D 30/70
See application file for complete search history.

(56) References Cited

U.S. PATENT DOCUMENTS

| | | | |
|---|---|---|---|
| 11,025,385 B2 | 6/2021 | Onggosanusi et al. | |
| 2008/0037472 A1 | 2/2008 | Ryu et al. | |
| 2009/0154386 A1 | 6/2009 | So et al. | |
| 2009/0207773 A1 | 8/2009 | Feng et al. | |
| 2011/0058511 A1 | 3/2011 | Kim et al. | |
| 2018/0278392 A1 | 9/2018 | Onggosanusi et al. | |
| 2019/0223164 A1* | 7/2019 | He | H04L 25/0204 |
| 2019/0254110 A1* | 8/2019 | He | H04L 41/0896 |
| 2019/0281504 A1* | 9/2019 | Su | H04W 76/28 |
| 2019/0313332 A1* | 10/2019 | Wu | H04W 52/0219 |
| 2020/0037396 A1* | 1/2020 | Islam | H04W 52/0229 |
| 2020/0295903 A1 | 9/2020 | Faxér | |
| 2020/0336227 A1 | 10/2020 | Takeda et al. | |
| 2021/0212033 A1 | 7/2021 | Islam et al. | |
| 2021/0307108 A1* | 9/2021 | Babaei | H04L 1/189 |
| 2022/0210766 A1* | 6/2022 | Liu | H04W 72/30 |
| 2023/0040690 A1* | 2/2023 | Chen | H04L 5/0053 |

OTHER PUBLICATIONS

Ericsson, "Support for NR Miticast Reception in RRC Inactive/Idle", 3GPP Draft; R1-2101728, vol. RAN WG1, e-Meeting #104e, 2021, 6 pages.

European Extended Search Report for Application No. 22161912.5, mailed Jul. 29, 2022.

Nokia et al., "Group Scheduling Mechamisms to Support 5G Multicast / Broadcast Services for RRC_CONNECTED UEs", 3GPP Draft; R1-2008882, vol. RAN WG1, e-Meeting #103e, 2020, 10 pages.

European Office Action for Application No. 22161912.5, mailed Jun. 16, 2025.

* cited by examiner

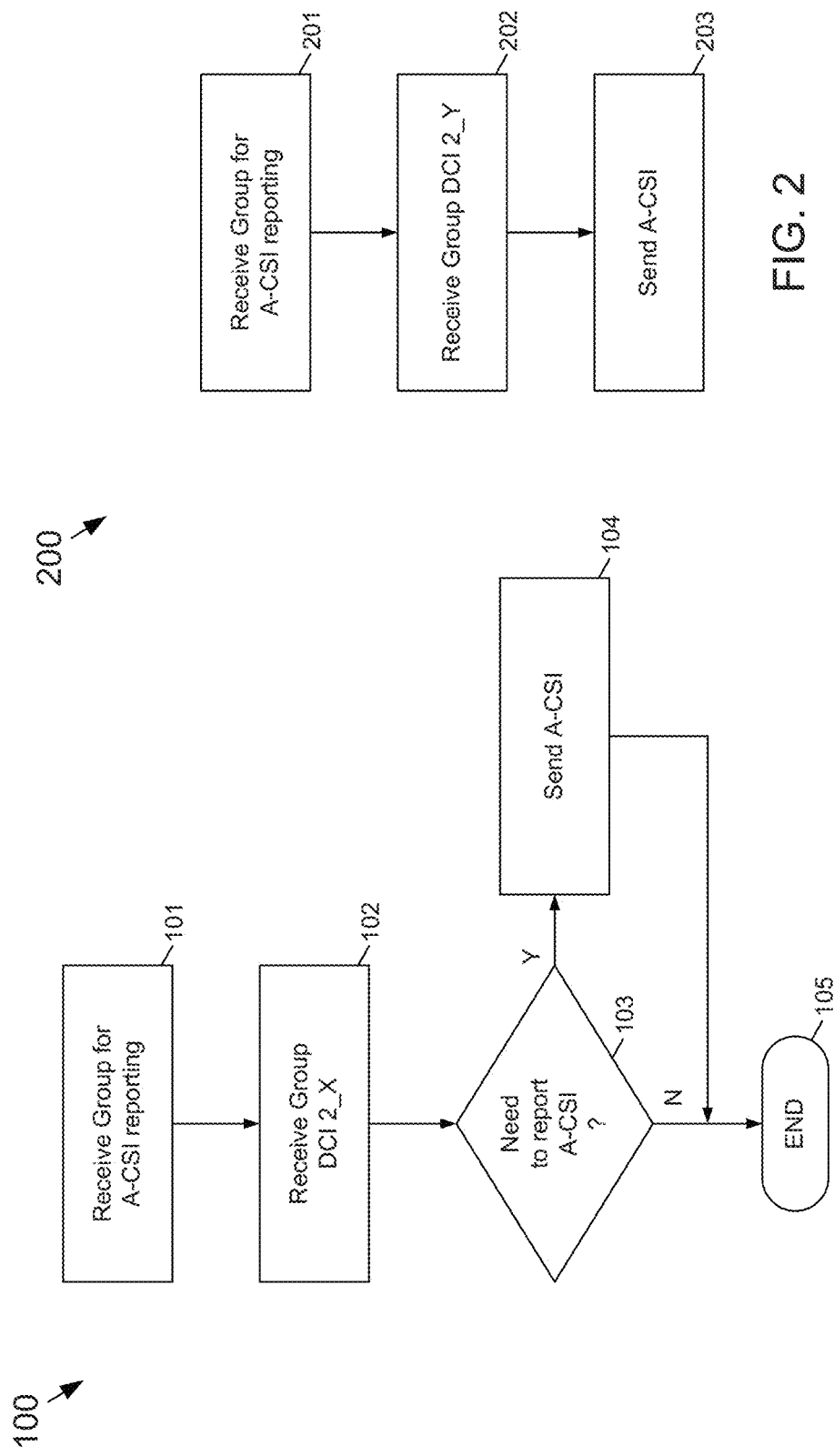

REDUCING POWER CONSUMPTION FOR MBS UEs

CROSS-REFERENCE TO RELATED APPLICATION

This application claims the priority benefit under 35 U.S.C. § 119(e) of U.S. Provisional Application No. 63/161,985, filed on Mar. 16, 2021, and U.S. Provisional Application No. 63/162,301, filed on Mar. 17, 2021, the disclosures of which are incorporated herein by reference in their entirety.

TECHNICAL FIELD

The subject matter disclosed herein relates to wireless communications. More particularly, the subject matter disclosed here relates to systems and methods for reducing power in a Multicast and Broadcast Services (MBS) device.

BACKGROUND

Bandwidth part (BWP) switching in new radio (NR) Rel. 15/16 may reduce power consumption when a user equipment (UE) does not need to operate on wide bandwidth. BWP switching may at least be triggered through downlink control information (DCI) indicating BWP switching to receive/transmit downlink/uplink, the expiry of BWP-InactivityTimer, or radio resource control (RRC) (re)configuration.

The UE may (re)start the BWP-InactivityTimer, i.e., stay in the active BWP for longer period of time, upon at least receiving a physical downlink control channel (PDCCH) with a cell-radio network temporary identifier (C-RNTI) or a configured scheduling RNTI (CS-RNTI) on the active BWP, receiving PDCCH with a C-RNTI or a CS-RNTI that schedule/trigger downlink (DL)/uplink (UL) transmission on the active BWP.

Switching the BWP may involve some time to enable adjusting the Tx/Rx chain base on the new active BWP. If the switching occurs due to the reception of PDCCH with BWP switching command, a UE is not required to transmit/receive from the end of the third symbol of a slot in which the PDCCH is received to the beginning of the slot indicated by time domain resource assignment (TDRA) field. This time offset has to be of a greater particular delay period required to conduct BWP switching. (See 3GPP TS 38.213: "Physical layer procedures for control," Rel. 16, V16.4.0 and 3GPP TS 38.321: "Medium Access Control (MAC) protocol specification," Rel. 16, V16.3.0.)

On the other hand, if the BWP occurs due to the expiry of BWP-InactivityTimer, a UE is not required to transmit/receive from the subframe in Frequency Range 1 (FR1) or half of a subframe in FR2 that is immediately after the expiry of the BWP to the beginning of the slot in which the UE can transmit/receive based on predefined delay periods required to conduct BWP switching.

Fifth Generation (5G) wireless technology has been primarily designed to address a wide range of use cases that have been categorized into an enhanced mobile broadband (eMBB) category, an ultra-reliable and low latency communication (URLLC) category, and a massive machine-type communication (mMTC) category. Nevertheless, there may be a few other use cases that may be in-between the main use cases, such as industrial wireless sensor networks, video surveillance, or wearables. In order to efficiently serve such other use cases in Release 17, the 3rd Generation Partnership Project (3GPP) has introduced reduced-capability new radio (NR) devices (NR-RedCap) that has a lower cost and complexity, a smaller form factor, and a longer battery life as compared to regular NR devices. For RedCap User Equipments (UEs), one of the challenges may be that the load of RedCap UEs on the Physic Downlink Control Channel (PDCCH) may be likely to be much greater than for eMBB or URLLC UEs in some deployment scenarios, e.g., high-density indoor industrial sensors. As disclosed herein, group scheduling of RedCap UEs may be used to alleviate a potential congestion and to minimize signaling overhead introduced by high-density RedCap UE deployment scenarios.

Channel State Information (CSI) Report framework in NR is made up of two large parts. A first part is for the configuration and a second part is for Triggering States that may be associated with a specific configuration based on 3GPP specification 38.214-5.2.1.

Physical layer parameters for signal generation and resource element mapping for the CSI related reference signal are configured by Radio Resource Control (RRC) parameters. The physical layer parameter set may be configured and stored, and the CSI ResourceConfig selects a specific parameter set that is configured.

CSI ResourceConfig specifies what type of reference signal (nzp-CSI-RS-SSB, csi-IM-Resource) is to be used. It also configures the types of the resources (periodic, aperiodic, semipersistent).

CSI ReportConfig specifies which CSI ResourceConfig is to be used for the measurement and includes a mapping table between the measurement type and the corresponding CSR ResourceConfig ID.

CSI-AperiodicTriggerStateList IE (Information Element) is used to configure a UE with a list of aperiodic trigger states. Each codepoint of the DCI field "CSI request" may be associated with one trigger state (see TS 38.321, clause 6.1.3.13). Upon reception of the value associated with a trigger state, a UE may perform measurement of CSI-RS, CSI-IM and/or SSB (reference signals) and aperiodic reporting on L1 based on all entries in the associatedReportConfigInfoList for that trigger state. An example CSI-AperiodicTriggerStateList information element follows.

```
-- ASN1START
-- TAG-CSI-APERIODICTRIGGERSTATELIST-START
CSI-AperiodicTriggerStateList ::=         SEQUENCE (SIZE (1..maxNrOfCSI-AperiodicTriggers)) OF CSI-
AperiodicTriggerState
CSI-AperiodicTriggerState ::=             SEQUENCE {
    associatedReportConfigInfoList                SEQUENCE
    (SIZE(1..maxNrofReportConfigPerAperiodicTrigger)) OF CSI-AssociatedReportConfigInfo,
    ...
}
CSI-AssociatedReportConfigInfo ::=        SEQUENCE {
    reportConfigId                                CSI-ReportConfigId,
```

| | |
|---|---|
| resourcesForChannel | CHOICE { |
| nzp-CSI-RS | SEQUENCE { |
| resourceSet | INTEGER (1..maxNrofNZP-CSI-RS- |
| ResourceSetsPerConfig), | |
| qcl-info | SEQUENCE (SIZE(1..maxNrofAP-CSI-RS- |
| ResourcesPerSet)) OF TCI-StateId | |
| | OPTIONAL |
| -- Cond Aperiodic | |
| }, | |
| csi-SSB-ResourceSet | INTEGER (1..maxNrofCSI-SSB-ResourceSetsPerConfig) |
| }, | |
| csi-IM-ResourcesForInterference | INTEGER(1..maxNrofCSI-IM-ResourceSetsPerConfig) |
| | OPTIONAL, |
| -- Cond CSI-IM-ForInterference | |
| nzp-CSI-RS-ResourcesForInterference | INTEGER (1..maxNrofNZP-CSI-RS-ResourceSetsPerConfig) |
| | OPTIONAL, |
| -- Cond NZP-CSI-RS-ForInterference | |
| ... | |
| } | |
| -- TAG-CSI-APERIODICTRIGGERSTATELIST-STOP | |
| -- ASN1STOP | |

CSI-AssociatedReportConfigInfo Field Descriptions

Csi-IM-ResourcesForInterference
CSI-IM-ResourceSet for interference measurement. Entry number in csi-IM-ResourceSetList in the CSI-ResourceConfig indicated by csi-IM-ResourcesForInterference in the CSI-ReportConfig indicated by reportConfigId above (value 1 corresponds to the first entry, value 2 to the second entry, and so on). The indicated CSI-IM-ResourceSet should have exactly the same number of resources like the NZP-CSI-RS-ResourceSet indicated in nzp-CSI-RS-ResourcesforChannel.
csi-SSB-ResourceSet
CSI-SSB-ResourceSet for channel measurements. Entry number in csi-SSB-ResourceSetList in the CSI-ResourceConfig indicated by resourcesForChannelMeasurement in the CSI-ReportConfig indicated by reportConfigId above (value 1 corresponds to the first entry, value 2 to the second entry, and so on).
nzp-CSI-RS-ResourcesForInterference
NZP-CSI-RS-ResourceSet for interference measurement. Entry number in nzp-CSI-RS-ResourceSetList in the CSI-ResourceConfig indicated by nzp-CSI-RS-ResourcesForInterference in the CSI-ReportConfig indicated by reportConfigId above (value 1 corresponds to the first entry, value 2 to the second entry, and so on).
qcl-info
List of references to TCI-States for providing the QCL source and QCL type for each NZP-CSI-RS-Resource listed in nzp-CSI-RS-Resources of the NZP-CSI-RS-ResourceSet indicated by nzp-CSI-RS-ResourcesforChannel. Each TCI-StateId refers to the TCI-State which has this value for tci-StateId and is defined in tci-StatesToAddModList in the PDSCH-Config included in the BWP-Downlink corresponding to the serving cell and to the DL BWP to which the resourcesForChannelMeasurement (in the CSI-ReportConfig indicated by reportConfigId above) belong to. First entry in qcl-info-forChannel corresponds to first entry in nzp-CSI-RS-Resources of that NZP-CSI-RS-ResourceSet, second entry in qcl-info-forChannel corresponds to second entry in nzp-CSI-RS-Resources, and so on (see TS 38.214 [19], clause 5.2.1.5.1)
reportConfigId
The reportConfigId of one of the CSI-ReportConfigToAddMod configured in CSI-MeasConfig
resourceSet
NZP-CSI-RS-ResourceSet for channel measurements. Entry number in nzp-CSI-RS-ResourceSetList in the CSI-ResourceConfig indicated by resourcesForChannelMeasurement in the CSI-ReportConfig indicated by reportConfigId above (value 1 corresponds to the first entry, value 2 to the second entry, and so on).

SUMMARY

An example embodiment provides a device that may include an interface to a wireless communication network and a controller. The interface may be configured to receive wireless communications from the wireless communication network. The controller may be configured to control the interface to selectively receive unicast communications in a bandwidth part (BWP) of the wireless communication network and to selectively receive communications in a common frequency resource (CFR) of the wireless communications, and the controller may be configured to control the interface to selectively receive communications in the CFR to reduce a power consumption of the device. In one embodiment, the controller may be further configured to control the interface to selectively receive communications in the CFR to reduce a frequency bandwidth of the interface. In another embodiment, the device may include a first timer that may be configured to start based on a reception by the interface of one of a unicast physical downlink control channel (PDCCH), a first PDCCH, or a first Medium Access Control (MAC) Protocol Data Unit (PDU) received in a configured downlink assignment, and while the first timer is running, the first timer may be further configured to restart based on a reception by the interface of a second PDCCH, or second MAC PDU received in a configured downlink assignment for before a first predetermined period of time ends. In still another embodiment, the controller may further control the interface to reduce a frequency bandwidth of the interface to be a default/initial BWP based on the first predetermined period of time ending. In yet another embodiment, the PDCCH may include a Group Common-Physical Downlink Control Channel (GC-PDCCH) scrambled by a Group-Radio Network Temporary Identifier (G-RNTI) for dynamic scheduling a Physical Downlink Shared Channel (PDSCH), or a GC-PDCCH scrambled by a Group-Configured Scheduling-Radio Network Temporary Identifier (G-CS-RNTI) for activation/deactivation of a Semi-Persistent Scheduling (SPS) PDSCH. In one embodiment, the controller may further control the interface to stop monitoring communications after a predetermined period without receiving a communication or based on a reception by the interface of an explicit indication of an absence of activity received in one of a device-specific PDCCH or a group common PDCCH. In another embodiment, based on the device being in a state in which monitoring communication activity has stopped, the controller may be further configured to control the interface to resume monitoring communication activity after a predetermined period of time based on a reception by the interface of an indication of a predetermined skipping period of time, an indication in a device-specific PDCCH, or a group common PDCCH. In still another embodiment, the CFR may be contained within a unicast default/initial BWP, and the controller may be further configured to control the interface to resume monitoring communication activity in the CFR based on the interface switching from a wide bandwidth to the unicast default/initial BWP. In yet another embodiment, when the controller controls the interface to stop monitoring the Physical Downlink Control Channel (PDCCH), the PDCCH may be continued to be counted toward a Blind Decode/Control Channel Elements (BD/CCEs) budget for the device. In one embodiment, when the controller controls the interface to stop monitoring the PDCCH, the PDCCH may be excluded from a count toward a Blind Decode/Control Channel Elements (BD/CCEs) budget for the device.

An example embodiment provides a method in a wireless communication network in which the method may include receiving, by an interface of a device to the wireless communication network, wireless communications from the wireless communication network; controlling the interface, by a controller of the device, to receive unicast communications in a bandwidth part (BWP) of the wireless communication network and to receive communications in a common frequency resource (CFR) of the wireless communications; and controlling the interface, by the controller, to selectively receive communications in the CFR to reduce a power consumption of the device. In one embodiment, the method may further include controlling the interface, by the controller, to selectively receive communications in the CFR to reduce a frequency bandwidth of the interface. In another embodiment, the method may further include starting a first timer based on a reception by the interface of one of a unicast physical downlink control channel (PDCCH), a first PDCCH or a first Medium Access Control (MAC) Protocol Data Unit (PDU) received in a configured downlink assignment; and restarting the first timer while the first timer is running based on a reception by the interface of a second PDCCH or a second MAC PDU received in a configured downlink assignment for before a first predetermined period of time ends. In still another embodiment, the method may further include controlling the interface, by the controller, to reduce a frequency bandwidth of the interface to be a default/initial BWP based on the first predetermined period of time ending. In yet another embodiment, the PDCCH may include a Group Common-Physical Downlink Control Channel (GC-PDCCH) scrambled by a Group-Radio Network Temporary Identifier (G-RNTI) for dynamic scheduling a Physical Downlink Shared Channel (PDSCH), or a GC-PDCCH scrambled by a Group-Configured Scheduling-Radio Network Temporary Identifier (G-CS-RNTI) for activation/deactivation of a Semi-Persistent Scheduling (SPS) PDSCH. In one embodiment, the method may further include controlling the interface, by the controller, to stop monitoring communications after a predetermined period of time without communication or based on a reception by the interface of an explicit indication of an absence of communication activity received in one of a device-specific PDCCH or a group common PDCCH. In another embodiment, the method may further include controlling the interface, by the controller, to resume monitoring communication activity after a predetermined period of time based on a reception by the interface of an indication of a predetermined skipping period of time, an indication in a device-specific PDCCH, or a group common PDCCH, and based on the device being in a state in which monitoring communication activity has stopped. In still another embodiment, the CFR may be contained within a unicast default/initial BWP, and the method may further include controlling the interface, by the controller, to resume monitoring communication activity in the CFR based on the interface switching from a wide bandwidth to the unicast default/initial BWP. In yet another embodiment, the method may further include controlling the interface, by the controller, to stop monitoring the PDCCH; and continuing to count the PDCCH toward a Blind Decode/Control Channel Elements (BD/CCEs) budget for the device. In one embodiment, the method may further include controlling the interface, by the controller, to stop monitoring the PDCCH; and excluding the PDCCH from a count toward a Blind Decode/Control Channel Elements (BD/CCEs) budget for the device.

BRIEF DESCRIPTION OF THE DRAWING

In the following section, the aspects of the subject matter disclosed herein will be described with reference to exemplary embodiments illustrated in the figure, in which:

FIG. 1 shows a flowchart for an example embodiment of a general process at a UE for group reporting for aperiodic CSI (A-CSI) according to the subject matter disclosed herein;

FIG. 2 is a flowchart of an example embodiment of a general process that uses a single command that applies to all UEs in a group according to the subject matter disclosed herein;

DETAILED DESCRIPTION

Figures 3, 4:
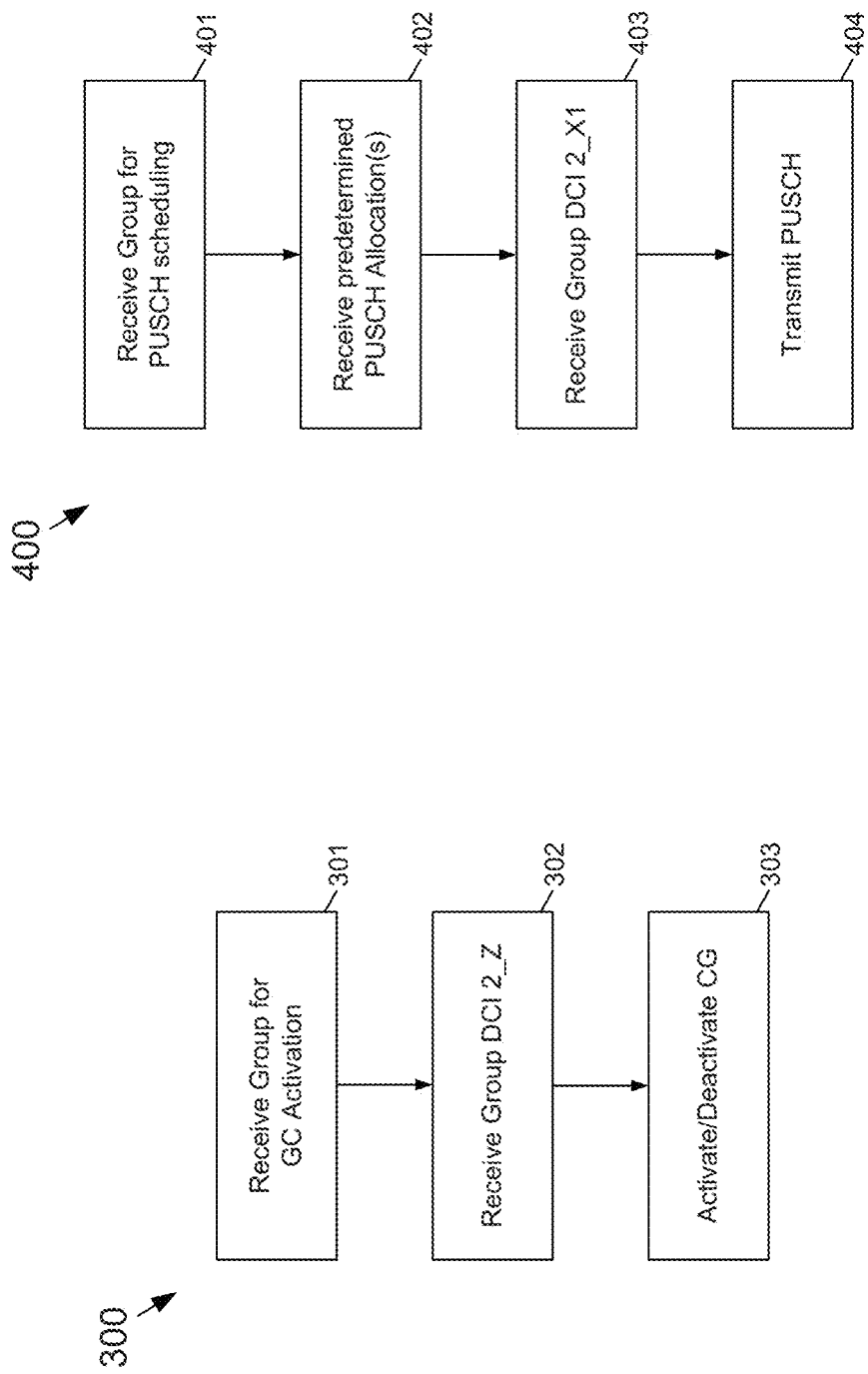
FIG. 3 is a flowchart of an example embodiment of a general process for a CG type 2 activation/deactivation according to the subject matter disclosed herein.
FIG. 4 is a flowchart of an example embodiment of a general process for group scheduling of dynamic PUSCH according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

List of Some Acronyms Used Herein

| Abbreviation | Definition |
| --- | --- |
| BD | Blind Decoding |
| BWP | Bandwidth Part |
| CCE | Control Channel Element |
| CFR | Common Frequency Resource |
| COT | Channel Occupancy Time |
| CRC | Cyclic Redundancy Check |
| C-RNTI | Cell-Radio Network Temporary Identifier |
| CSI | Channel State Information |
| CSI-IM | Channel State Information-Interference measurement |

-continued

List of Some Acronyms Used Herein

| Abbreviation | Definition |
| --- | --- |
| CSI-RS | Channel State Information-Reference signal |
| CS-RNTI | Configured Scheduling-Radio Network Temporary Identifier |
| DCI | Downlink Control Information |
| DL | Downlink |
| eMBB | Enhanced Mobile BroadBand |
| FDRA | Frequency Domain Resource Assignment |
| GC-PDCCH | Group Common-Physical Downlink Control Channel |
| gNB | Next Generation NodeB |
| MAC-CE | Medium Access Control-Control Element |
| MAC PDU | Medium Access Control Protocol Data Unit |
| MBS | Multicast and Broadcast Services |
| mMTC | Massive Machine-Type Communication |
| NR | New Radio |
| NZP-CSI-RS | Non-Zero Power CSI-RS |
| OFDM | Orthogonal Frequency Domain Multiplexing |
| OSI | Other System Information |
| PDCCH | Physical Downlink Control Channel |
| PDSCH | Physical Downlink Shared Channel |
| PRB | Physical Resource Block |
| PRB | Physical Resource Block |
| P-RNTI | Paging-Radio Network Temporary Identifier |
| PTM | Point to Multipoint |
| PTP | Point to Point |
| RedCap | Reduced-Capability new radio (NR) devices |
| RF | Radio Front |
| RMSI | Remaining System Information |
| RRC | Radio Resource Control |
| SFI | Slot Format Indicator |
| SI-RNTI | System Information-Radio Network Temporary Identifier |
| SPS | Semi-Persistent Scheduling |
| SS | Search Space |
| SSB | Synchronization Signal Block |
| TDRA | Time Domain Research Assignment |
| UE | User Equipment |
| UL | Uplink |
| URLLC | Ultra-Reliable and Low Latency Communication |

Group Common DCI

In wireless communications, bandwidth parts and other wireless resources may be used by wireless devices. A base station may determine that one or more wireless devices should use or switch to one or more bandwidth parts or other wireless resources. Accordingly, it may be advantageous to improve wireless communications without adversely increasing signaling overhead and/or decreasing spectral efficiency. A group common DCI may be intended for transmitting the same DCI to a group of UEs to minimize the signaling overhead. The main use cases include, for example: Dynamic Slot Format Indication (SFI) to indicate slot related information for one or more slots from which a UE may derive at least which symbols in a slot are Downlink, Uplink and Flexible. The SFI carries an index to a UE-specific table (i.e., configured via RRC). Another example is a Downlink Pre-Emption Indication (PI) that may be used to transmit in different DCI than a SFI and whether a UE may monitor preemption indication is configured by RRC signaling. Group common DCIs are described in TS38.212 and are referred to as DCI 2_A (A may take values for 1 to 6 at this stage).

For RedCap UEs, the load on the PDCCH may likely be greater than for eMBB reasons. RedCap UEs bandwidth is limited, which may lead to potentially smaller CORESETS than for eMBB UEs. For a 20 MHz bandwidth, which is typically viewed as the maximum FR1 bandwidth for a RedCap UE, the number of PRBs is 51 for a 30 kHz SCS (subcarrier spacing) and 24 for a 60 kHz SCS. An eMBB device with a 100 MHz bandwidth roughly has five times more Physical Resource Blocks (PRBs).

Also, RedCap UEs may have small packets to transmit. For small packets, the ratio of control-to-data increases.

There may be a large number of RedCap UEs deployed in some scenarios (e.g., sensors). For instance: a gNodeB (gNB) may collect data or measurements from many devices at the same time. Or, for live video feeds, many live videos may be connected at once. This would involve a large demand for PUSCH traffic, thus many DCIs. Similarly, for the PDSCH, e.g., industrial deployments, a gNB may send different instructions to many devices, e.g., actuators, to perform certain tasks. If a machine has many sensors, actuators, etc., then a gNB may transmit different data/instructions.

The number of RX chains on a RedCap UE may be lower than for an eMBB device (as low as 1). Because of a lower received energy, a gNB may use a higher aggregation level, thus resulting in a higher occupancy of the PDCCH search spaces.

The issue of increased PDCCH load was identified and noted at RAN1#104-e in the following agreement.
Agreements:
 For reduced minimum number of Rx branches in FR1 and FR2 frequency bands where a legacy NR UE is required to be equipped with a minimum of 2 Rx antenna ports:
 FFS: need for solutions to reduced PDCCH blocking.
 FFS: need for reporting of UE antenna related information to gNB (e.g., # of panels, polarization, etc.).
 Information related to the reduction of the number of antenna branches is assumed to be known at the gNB (either implicitly or explicitly, to be FFS).

Therefore, there may be a need for solutions to reduce the PDCCH load for RedCap UEs.

Group Scheduling for Aperiodic CSI with Per-UE Command

A first solution disclosed herein includes defining a new group format (hereby referred to as DCI 2_X). Some UEs may be grouped together and one DCI command may be used to trigger Aperiodic CSI for all the UEs in the group.

In one embodiment, a group DCI format is defined to schedule aperiodic CSI reporting for a group of UEs. FIG. 1 shows a flowchart for an example embodiment of a general process 100 at a UE for group reporting for aperiodic CSI (A-CSI) according to the subject matter disclosed herein.

Group formation may be performed at 101 by UEs receiving a command for A-CSI reporting. A group formation for A-CSI reporting may be performed in a way that is similar to Transmit Power Control (TPC) groups for group power command controls. Support for group scheduling A-CSI reporting may be indicated by a UE capability in a similar way that, for example, supports a Transmit Power Control (TPC) power command.

In one embodiment, a UE capability may be added for indicating support of group scheduling of A-CSI reporting. In another embodiment, Support for the UE capability indicating support of group scheduling of A-CSI by the UEs of the RedCap type may be mandatory. A gNB may assign a group indicator to the UE that identifies the group that will jointly receive a group command via one DCI format 2_X message, which is received by the UE at 102.

As disclosed herein, the group indicator may be referred to as an ACR-RNTI (A-CSI Reporting RNTI). The ACR-RNTI may be assigned by higher layers. One solution may be to use RRC signaling, although Media Access Control (MAC) signaling may also be possible. Another solution may be to add a field in the PhysicalCellGroupConfig IE, as shown below:

```
-- ASN1START
-- TAG-PHYSICALCELLGROUPCONFIG-START
PhysicalCellGroupConfig ::=              SEQUENCE {
    harq-ACK-SpatialBundlingPUCCH        ENUMERATED {true}
OPTIONAL,                    -- Need S
    harq-ACK-SpatialBundlingPUSCH        ENUMERATED {true}
OPTIONAL,                    -- Need S
    p-NR-FR1                             P-Max
OPTIONAL,                    -- Need R
    pdsch-HARQ-ACK-Codebook              ENUMERATED {semiStatic, dynamic},
    tpc-SRS-RNTI                         RNTI-Value
OPTIONAL,                    -- Need R
    tpc-PUCCH-RNTI                       RNTI-Value
OPTIONAL,                    -- Need R
    tpc-PUSCH-RNTI                       RNTI-Value
OPTIONAL,                    -- Need R
    sp-CSI-RNTI                          RNTI-Value
OPTIONAL,                    -- Need R
    cs-RNTI                              SetupRelease { RNTI-Value }
[Omitted fields]
    [[
[Omitted fields]
    ACR-RNTI-r17                         RNTI-Value
OPTIONAL                     -- Need R
    ]]
}
```

The new field ACR-RNTI (suffix release omitted) may be generally optional. It may, however, be mandated to be present for UEs of RedCap type.

Once a gNB has assigned a group to a given UE, the gNB sends a message to indicate to the UE its location within the group. This may be used by the UE to determine which fields to monitor in the group DCI command. The message may use a format similar to the PUSCH-TPC-CommandConfig.

In one embodiment, a gNB may assign the UE an index within its group of UEs for group-scheduling of A-CSI reporting using the following IE.

```
ACSI-Group-CommandConfig ::=             SEQUENCE {
    ACR-Index                            INTEGER (1..15),
```

```
    [Potentially other fields]
}
```

The ACSI-Group-CommandConfig IE, as defined in the example above, may apply to a group of 15 UEs. A different group size may be used without any loss of generality. This Information Element (IE) may be sent within a CSI-Report-Config.

A gNB may then sends the group DCI 2_X in one of the search spaces that the UEs of the group monitor. The DCI format 2_X may be used for the transmission of group CSI reporting commands.

The following information may be transmitted by means of the DCI format 2_X with CRC scrambled by ACR-RNTI: block number 1, block number 2, . . . , block number N. The parameter ACR-Index provided by higher layers may determine the index to the block number with the following fields defined for each block: Aperiodic CSI reporting: 1 bit. The value 1 indicates that the UE must report CSI.

Other fields may be transmitted in DCI 2_X (see embodiment further down on PUCCH resources to use). Also, the UE should determine the uplink resources to where the A-CSI is to be sent. If the UE is to report CSI, flow continues to 104 where a A-CSI is sent. Flow continues to 105 where the process ends. If, at 103, the UE is not to report CSI, flow continues to 105 where the process ends.

Several embodiments are described below, covering feedback sent either on the PUSCH (as is the current procedure for A-CSI reporting for Rel-15 NR), or on the PUCCH. In one example embodiment, PUCCH resources may be indicated by higher layer signaling. For periodic CSI, the PUCCH resources to use may be configured by higher-layer signaling in the CSI-ReportConfig IE. The report may be configured for periodic, semi-persistent, and aperiodic. A fourth category, for group aperiodic, may be used. For group aperiodic feedback, the report may be similar to the configuration for periodic CSI feedback. Note that for the PUCCH resource list, there might not be a reason to consider all the BWPs, and a single BWP might be sufficient. If not, the same signaling as for the periodic reporting may be used.

```
CSI-ReportConfig ::=           SEQUENCE {
    reportConfigId                 CSI-ReportConfigId,
    carrier                        ServCellIndex            OPTIONAL,   -- Need S
    resourcesForChannelMeasurement CSI-ResourceConfigId,
    csi-IM-ResourcesForInterference CSI-ResourceConfigId    OPTIONAL,   -- Need R
    nzp-CSI-RS-ResourcesForInterference CSI-ResourceConfigId OPTIONAL,  -- Need R
    reportConfigType               CHOICE {
        periodic                       SEQUENCE {
            reportSlotConfig               CSI-ReportPeriodicityAndOffset,
            pucch-CSI-ResourceList         SEQUENCE (SIZE (1..maxNrofBWPs)) OF PUCCH-
CSI-Resource
        },
        semiPersistentOnPUCCH          SEQUENCE {
            reportSlotConfig               CSI-ReportPeriodicityAndOffset,
            pucch-CSI-ResourceList         SEQUENCE (SIZE (1..maxNrofBWPs)) OF PUCCH-
CSI-Resource
        },
        semiPersistentOnPUSCH          SEQUENCE {
            reportSlotConfig               ENUMERATED {sl5, sl10, sl20, sl40, sl80,
sl160, sl320},
            reportSlotOffsetList           SEQUENCE (SIZE (1..maxNrofUL-Allocations)) OF
INTEGER(0..32),
            p0alpha                        P0-PUSCH-AlphaSetId
        },
        aperiodic                      SEQUENCE {
            reportSlotOffsetList           SEQUENCE (SIZE (1..maxNrofUL-Allocations)) OF
INTEGER(0..32)
            groupAperiodic                 SEQUENCE {
                reportSlotConfig               CSI-ReportPeriodicityAndOffset,
                pucch-CSI-Resource             PUCCH-CSI-Resource
            }
[fields omitted]
}
```

Aperiodic CSI reporting field may be more than one bit, and could indicate what the UE should report: RI, PMI, RI+PMI, etc. The UE may also indicate the configured report slot offset to use. In such a case, the DCI format may reuse the reportTriggerSize field of DCI 0_1 or DCI 0_2, In one embodiment, an index of the applied CSI report may be indicated for each block: for each block, (at least) the field CSI request (of the DCIs 0-1 or 0-2) that should be added. In another embodiment, there may only be one index of the applied CSI report being sent. The first UE of the group may use this value, the other UEs of the group may derive their indices of the applied CSI report based on their index in the group and the CSI request being signaled.

Upon receiving DCI format 2_X, a UE knows whether it is to report CSI. At 103, when a UE should send A-CSI, the PUCCH Resources Indicated by Higher-Layer Signaling Instead of being configured by RRC signaling, a PUCCH resource may be indicated by a DCI. There may be several possibilities. In one embodiment, the PUCCH resources may be indicated for each block. That is, for each block, (at least) the field PUCCHresourceindicator (of the DCIs 1_X) may be added. In another embodiment, there may only be one PUCCHresourceindicator that is sent. A first UE of the group may use this value, and the other UEs of the group may derive their PUCCH resources based on their index in the group and the PUCCHresource indicator that is being signaled.

PUSCH Resources Indicated in the DCI

For A-CSI reporting, the PUSCH is currently used. For group scheduling, the most straightforward way may be to use a similar process. The PUSCH resources that may be indicated in the DCI signaling may indicate that such a feedback should be sent. The PUSCH resources may be pre-defined by RRC signaling by including the information of the DCI in an IE. One embodiment may be to use the CSI-ReportConfig IE and to define a groupAperiodic type in which the PUSCH parameters may be indicated similar to PUCCH resources being indicated by higher-layer signaling, but with PUSCH configuration instead of PUCCH configuration. While the fields of any uplink DCI may be used, format 0_0 may be a good candidate, and at least the following fields may be included: Frequency domain resource assignment, Time domain resource assignment, and Modulation and coding scheme. Alternatively, different formats may be used: for instance, in the ConfiguredGrant-Config IE, fields are defined to allocate PUSCH resources. The same fields may be reused.

PUSCH Resources Reserved by a Configured Grant

There may be a way to allocate PUSCH resources by the RRC layer by using a CG type 1 or type 2. In one embodiment, one CG (preferably a type 1, although type 2 may be used as well) may be defined by a gNB and may be used for the purpose of sending A-CSI feedback. The CG index may be pre-determined and reserved for A-CSI reporting. For instance, the CG with configuredGrantConfigIndex 0 may be used for A-CSI reporting. Alternatively, configuredGrant-ConfigIndex may be indicated in the DCI. For DCI 2_X, this may involve adding configuredGrantConfigIndex in each block. For DCI 2_Y, this may involve indicating a block indication with each block indicating a configuredGrant-ConfigIndex. This may involve having an order in the reporting group defined for DCI 2_Y as well.

In another embodiment, it may be assumed that all UEs may use the same configuredGrantConfigIndex for their reporting because configured grants may be configured on a per-UE basis. This does not mean that the UEs may use the same resources for A-CSI reporting, but only the same configuredGrantConfigIndex value. In that case, a single field in DCI 2_X and/or DCI 2_Y may be used. Compared with the previous embodiment, this does not involve defining a group order for DCI 2_Y.

Group Scheduling for Aperiodic CSI with Single Command

In another embodiment, a group may be created and a single DCI (DCI 2_Y) may be sent to trigger aperiodic CSI reporting. Instead of having a different block for each UE, however, there may be a single command that applies to all UEs in a group. FIG. 2 is a flowchart of an example embodiment of a general process 200 that uses a single command that applies to all UEs in a group according to the subject matter disclosed herein.

Group formation may be similar to that described above in connection with process 100 in FIG. 1. At 201, each UE may receive an assignment for an ASR-RNTI. However, because there is a single command, in some cases, there may be no need to indicate the index in the group. Thus, the ACSI-Group-CommandConfig IE may not always be involve. In some embodiments, the ACSI-Group-Command-Config IE may still be involved so that a UE may figure out its PUCCH resources, as explained below.

A gNB then may send the group DCI 2_X in one of the search spaces that the UEs of the group monitor, which is received at 202 by the UEs of the group. The DCI format 2_Y may be different than DCI format 2_X, and may be defined as follows. The following information may be transmitted by way of the DCI format 2_Y with CRC scrambled by ACR-RNTI: The DCI format includes a defined 1 bit having a value 1, which indicates that a UE is to report CSI. Other fields may be transmitted in DCI 2_Y, as described below. The Aperiodic CSI reporting field may be more than one bit, and may indicate what the UE would like to report: RI, PMI, RI+PMI, as explained above. A UE may also indicate the configured report slot offset to use. At 203, the UE sends an Aperiodic CS.

Group Activation for Configured Grant Type 2

Another use case for usage of group DCIs for RedCap UEs may be for the activation/deactivation of configured grants type 2. For instance, if a group of sensors is deployed and periodically reports information, it may make sense to activate/deactivate all the configured grants at once. Embodiments to enable this operation are described in this section. While the description may be focused on uplink configured grants, the description may apply to other types of traffic, e.g., for activation/deactivation of periodic CSI reporting when done using an SP-CSI-RNTI. The procedure may also be described for an uplink, but may be extended to a downlink in a straightforward manner.

FIG. 3 is a flowchart of an example embodiment of a general process 300 for a CG type 2 activation/deactivation according to the subject matter disclosed herein. At 301, group formation may be performed in a similar way as for groups for A-CSI described above. A capability may be involved to indicate support of group activation of CG type 2. A new RNTI may be involved (referred to as CG2-RNTI) and may be indicated in a similar manner than ACR-RNTI). For some embodiments, a group order may be involved and may be determined in a similar manner as the group for group scheduling of A-CSI.

A gNB may then send the group DCI 2_Z in one of the search spaces that the UEs of the group monitor and receive at 302. In one embodiment, DCI format 2_Z may be defined as follows. DCI format 2_Z may be used for the transmission of group configured grant type 2 activation/deactivation. The following information may be transmitted by a DCI format 2_Z with CRC scrambled by CG2-RNTI: block number 1, block number 2, . . . , block number N. The parameter CG2 Index provided by higher layers may determine the index to the block number with the config-uredGrantConfigIndex field defined for each block, and $\lceil \log_2(\text{naxNrofConfiguredGrantConfig}) \rceil$ indicates the index of the Configured Grant configurations within the BWP for each block. An activateGrant may include 1 bit in which the value 1 means activating the CG type 2 with the index configuredGrantConfixIndex, and the value 0 deactivating the grant.

In other embodiment, there may be one configured grant type 2 per RedCap UE. In such a case, the field config-uredGrantConfigIndex may not be transmitted and each block may only include the activation/deactivation field. For this single CG type 2 case, it may also possible to use a format analog to format 2_Y to activate/deactivate all the CG type 2 with the same value at the same time. In such a case, there may be no need to define an order within the group. At 303, based on the received value in DCI 2_Z, a UE activates or deactivates the CG with the corresponding configuredGrantConfigIndex.

Group Signaling for Dynamic PUSCH

Group activation of CG type 2 may be a way to enable transmission for periodic traffic. There may, however, be plenty of cases in which a group of UEs transmit one-shot information. For instance, the network may pull information from a group of sensors. Similarly, on a downlink, a set of commands may be sent to a set of machines. For such cases, having a group command to schedule multiple UEs with a single command may be useful. Such a procedure is described for PUSCH. A procedure for PDSCH may be a straightforward extension and may rely on substantially the same procedure.

FIG. 4 is a flowchart of an example embodiment of a general process 400 for group scheduling of dynamic PUSCH according to the subject matter disclosed herein. At 401, group formation may be performed in a way that is similar to the way groups are formed for A-CSI, as described above. A capability may be involved to indicate support of group activation of dynamic PUSCH. A new RNTI may be used (referred to herein as DUS-RNTI) and may be indicated in a similar manner than ACR-RNTI). For some embodiments, a group order may be used and may be determined in a similar manner as the group for group scheduling of A-CSI.

At 402, each UE may be configured with one or more dynamic PUSCH allocation. In case the PUSCH allocation may not be unique, each dynamic PUSCH allocation may be referred to by a unique index. One possibility to indicate the predetermined PUSCH allocations may be to use a similar signaling as used for configuring configured grant. The IE BWP_UplinkDedicated may contain a list of potential dynamic PUSCH allocations, as shown below:

field, a MCS index to use (and possibly the MCS table to use), and frequency hopping information (if frequency hopping is used).

Additionally, PUSCHGrantConfig may contain an index to reference it. The structure and fields of PUSCHGrantConfig may reuse the structure and fields of ConfiguredGrantConfig when appropriate. For instance, the field "periodicity" of ConfiguredGrantConfig may not be needed. In some cases, the HARQ information may be included in PUSCHGrantConfig. In most cases, however, it may make more sense to include this information in the DCI.

A gNB then may send the group DCI 2_X1 in one of the search spaces that, at 403, the UEs of the group receive and monitor. In one embodiment, DCI format 2_X1 may be defined as follows. DCI format 2_X1 may be used for the transmission of group CSI reporting commands. The following information may be transmitted by way of the DCI format 2_X1 with CRC scrambled by CG2-RNTI: block number 1, block number 2, . . . , block number N. The parameter CG2-Index provided by higher layers may determine the index to the block number with the configuredGrantConfigIndex field defined for each block and the $[\log_2(\text{naxNrofConfiguredGrantConfig})]$ indicating the index

```
-- ASN1START
-- TAG-BWP-UPLINKDEDICATED-START
BWP-UplinkDedicated ::=              SEQUENCE {
    pucch-Config                     SetupRelease { PUCCH-Config }
OPTIONAL,    -- Need M
    pusch-Config                     SetupRelease { PUSCH-Config }
OPTIONAL,    -- Need M
    configuredGrantConfig            SetupRelease { ConfiguredGrantConfig }
OPTIONAL,    -- Need M
    srs-Config                       SetupRelease { SRS-Config }
OPTIONAL,    -- Need M
    beamFailureRecoveryConfig        SetupRelease { BeamFailureRecoveryConfig }
OPTIONAL,    -- Cond SpCellOnly
    ...,
    [[
    sl-PUCCH-Config-r16              SetupRelease { PUCCH-Config }
OPTIONAL,    -- Need M
    cp-ExtensionC2-r16               INTEGER (1..28)
OPTIONAL,    -- Need R
    cp-ExtensionC3-r16               INTEGER (1..28)
OPTIONAL,    -- Need R
    useInterlacePUCCH-PUSCH-r16      ENUMERATED {enabled}
OPTIONAL,    -- Need R
    pucch-ConfigurationList-r16      SetupRelease { PUCCH-ConfigurationList-r16 }
OPTIONAL,    -- Need M
    lbt-FailureRecoveryConfig-r16    SetupRelease { LBT-FailureRecoveryConfig-r16 }
OPTIONAL,    -- Need M
    configuredGrantConfigToAddModList-r16   ConfiguredGrantConfigToAddModList-r16
OPTIONAL,    -- Need N
    configuredGrantConfigToReleaseList-r16  ConfiguredGrantConfigToReleaseList-r16
OPTIONAL,    -- Need N
    configuredGrantConfigType2DeactivationStateList-r16
ConfiguredGrantConfigType2DeactivationStateList-r16   OPTIONAL   -- Need R
dynamicPUSCHGrantConfigList-r17   OPTIONAL   --Need R
    ]]
}
dynamicPUSCHGrantConfigList-r17   ::= SEQUENCE (SIZE
(1..maxNrofConfiguredDynamicPUSCHGrantConfig-r17)) OF DynamicPUSCHGrantConfig
```

In this example, a list of PUSCHGrantConfig may be provided. This may involve having a maximum possible number of grants. In another embodiment, a single PUSCHGrantConfig may be provided. In such a case, the list may be omitted.

PUSCHGrantConfig may contain the uplink grant information, and may contain the following: a frequency domain resource allocation field, a time domain resource allocation of the Configured Grant configurations within the BWP for each block. ActivateGrant may be 1 bit in which the value 1 means activating the CG type 2 with the index configuredGrantConfixIndex, and the value 0 deactivating the grant.

If there may only be one PUSCHGrantConfig per UE, the UE may send a single bit (per block) indicating activation/deactivation instead of PUSCHGrantConfigIndex. Additionally, in some cases in order to reduce overhead, there may be an association between PUSCHGrantIndex and the HARQ process number (e.g., they could be the same). In some cases, a DCI format analog to DCI 2_Y may be used. This, however, may lead to a significant loss in flexibility.

At 404, at predetermined PUSCH allocation(s), once a UE has obtained the DCI 2_X1 information, the UE may obtain the grant information in the PUSCHGrantConfig with the corresponding index and may transmit the PUSCH.

Group Signaling for Dynamic PDSCH

Group signaling for PUSCH was described above. A substantially similar procedure may be derived for dynamic PDSCH group scheduling with the definition of dynamicPDSCHGrantConfigList in, e.g., BWP-DownlinkDedicated. Additionally, a DCI format similar to DCI format 2_X1 may be defined. Alternatively, DCI 2_X1 may be reused if a flag is added to indicate if the DCI is for downlink or uplink.

For PDSCH, a UE may send HARQ feedback, thus should have PUCCH resources allocated. Thus, each UE may have a PDSCH-to-HARQ_feedback timing indicator and a PRI. The fields may be provided in the dynamicPDSCHGrantConfig.

Several solutions to use group scheduling for RedCap UEs have been disclosed. While described for RedCap, the solutions may also be used for non-RedCap UEs. Also, while described for a few use cases, the group scheduling mechanisms may be used for other purposes (e.g., Zp CSI-RS trigger, CG-DFI, etc.)

Search Space Switching

In NR-U Rel. 16, a search spacing switching feature was introduced to reduce power consumption due to frequent monitoring of a PDCCH before a next generation NodeB (gNB) acquires the channel by switching to less frequent monitoring of the PDCCH within the channel occupancy time (COT) of the gNB. The default search space group is a search space (SS) group having an index 0 that involves the UE to monitor a PDCCH more frequently.

A UE switches from SS group 0 to SS group 1 if the UE receives a DCI 2_0 explicitly indicating to switch to SS group 1, or if the UE detects that a PDCCH belongs to SS group 0. On the other hand, a UE switches back from SS group 1 to SS group 0 if the UE receives a DCI 2_0 explicitly indicating to switch to SS group 0, or if the searchSpaceTimer expires (this timer starts when the UE starts monitoring a PDCCH in SS group 1), or at the end of COT.

The UE uses some time (a delay period) to apply the configurations of the new SS group. The delay period may be provided through higher-layer signaling that may be greater than particular minimum predefined values. Additional details may be found in Clause 10.2 in the 3GPP TS 38.213: "Physical layer procedures for control", Rel. 16, V16.4.0.

NR Multicast and Broadcast Services (MBS)

For RRC_connected UEs, it has been agreed to have a common frequency resource (CFR) used for MBS activities and to be confined within the associated unicast BWP. There are two alternatives to define a CFR, either to define the CFR as a MBS BWP, or as a MBS region with contiguous physical resource blocks (PRBs), as shown in the following agreement.

---

Agreement:
For multicast of RRC-CONNECTED UEs, a common frequency resource for group-common PDCCH/PDSCH is confined within the frequency resource of a dedicated unicast BWP to support simultaneous reception of unicast and multicast in the same slot
Down select from the two options for the common frequency resource for group-common PDCCH/PDSCH
Option 2A: The common frequency resource is defined as an MBS specific BWP, which is associated with the dedicated unicast BWP and using the same numerology (SCS and CP)
FFS BWP switching is needed between the multicast reception in the MBS specific BWP and unicast reception in its associated dedicated BWP
Option 2B: The common frequency resource is defined as an 'MBS frequency region' with a number of contiguous PRBs, which is configured within the dedicated unicast BWP.
FFS: How to indicate the starting PRB and the length of PRBs of the MBS frequency region
FFS whether UE can be configured with no unicast reception in the common frequency resource
FFS on details of the group-common PDCCH/PDSCH configuration
FFS whether to support more than one common frequency resources per UE/per dedicated unicast BWP subjected to UE capabilities
FFS whether the use of a common frequency resource for multicast is optional or not
FFS whether the common frequency resource is applicable for PTM scheme 2 (if supported) or not

---

The basic functionalities were also agreed upon that are expected to be provided by a CFR, as shown in the following agreement. Basically, a CFR is expected to provide the configurations of a physical downlink shared channel (PDSCH), a PDCCH, and a semi-persistent scheduling (SPS) PDSCH for MBS activities.

---

Agreement:
From RAN1 perspective, the CFR (common frequency resource) for multicast of RRC-CONNECTED UEs, which is confined within the frequency resource of a dedicated unicast BWP and using the same numerology (SCS and CP), includes the following configurations:

-continued

Starting PRB and the number of PRBs
One PDSCH-config for MBS (i.e., separate from the PDSCH-Config of the dedicated unicast BWP)
One PDCCH-config for MBS (i.e., separate from the PDCCH-Config of the dedicated unicast BWP)
SPS-config(s) for MBS (i.e., separate from the SPS-Config of the dedicated unicast BWP)
FFS: Other configurations and details including whether signaling of starting PRB and the length of PRBs is needed when CFR is equal to the unicast BWP
FFS: Whether a unified CFR design is also used for broadcast reception for RRC_IDLE/INACTIVE and RRC_CONNECTED
FFS: Whether Coreset(s) for CFR in addition to existing Coresets in UE dedicated BWP is needed
Note: The terminology of CFR is only aiming for RAN1 discussion, and the detailed signaling design is up to RAN2
Note: This agreement does not negate any previous agreements made on CFR A similar agreement was reached for RRC_idle/inactive UEs. A key assumption is that a CFR is within the BWP that may be either an initial BWP or another MBS BWP. If the MBS BWP is used and the MBS BWP may be wider than the initial BWP, the MBS BWP needs to fully contain the initial BWP in this case.

Agreement:
For RRC_IDLE/RRC_INACTIVE UEs, for broadcast reception, further study the following cases of a configured/defined specific common frequency resource (CFR) for group-common PDCCH/PDSCH, and identify which case(s) will be supported:
[Case E] the case where a CFR is defined based on a configured BWP.
In particular, study the following:
whether a configured BWP for MBS is needed or not.
whether BWP switching is needed or not.
In this study, the configured BWP has the following properties:
The configured BWP is different than the initial BWP where the frequency resources of this initial BWP are configured smaller than the full carrier bandwidth.
The CFR has the frequency resources identical to the configured BWP.
The configured BWP needs to fully contain the initial BWP in frequency domain and has the same SCS and CP as the initial BWP.
Note: The configured BWP is not larger than the carrier bandwidth
the case where the initial BWP fully contains the CFR in the frequency domain.
In this study the following sub-cases are considered:
[Case B] A CFR with smaller size than the initial BWP, where the initial BWP has the same frequency resources as CORESET0. In this case the CFR has the frequency resources confined within the initial BWP and have the same SCS and CP as the initial BWP.
[Case D] A CFR with smaller size than the initial BWP, where the initial BWP has the frequency resources configured by SIB1. In this case the CFR has the frequency resources confined within the initial BWP and have the same SCS and CP as the initial BWP.
In particular, study the following:
Whether the considered two options with a CFR with smaller size than the initial BWP are needed or not for MBS.
the case where the initial BWP has same size as the CFR in the frequency domain.
In this study the following two sub-cases are considered:
[Case A] A CFR with the same size as the initial BWP, where the initial BWP has the same frequency resources as CORESET0. In this case the CFR has the same frequency resources and same SCS and CP as the initial BWP.
[Case C] A CFR with same size as the initial BWP, where the initial BWP has the frequency resources configured by SIB1. In this case the CFR has the same frequency resources and same SCS and CP as the initial BWP.
In particular, study the following:
Whether the considered two options with a CFR with the same size as the initial BWP are needed or not for MBS.

Moreover, it was agreed to apply the same definition of the maximum number of PDCCH candidates and non-overlapped CCEs in NR Rel. 15 to MBS. Also, as a working assumption, it was agreed to apply the same DCI size budget in NR Rel. 15 to MBS.

Agreement:
The maximum number of monitored PDCCH candidates and non-overlapped CCEs per slot per serving cell defined in Rel-15 is kept unchanged for Rel-17 MBS.
FFS whether the budget of BDs/CCEs of an unused CC can be used for group-common PDCCH to count the number of BDs/CCEs for UEs supporting CA capability based on configuration, which is similar to the method used for multi-DCI based multi-TRP in Rel-16.
Working Assumption:
Keep the "3 + 1" DCI size budget defined in Rel-15 for Rel-17 MBS.
FFS: Whether the G-RNTI is counted as "C-RNTI" or as "other RNTI" when considering the "3 + 1" DCI size budget rule for group-common PDCCH.

Monitoring a MBS PDCCH may cause additional power consumption compared with a PDCCH associated with an unicast transmission for the following reasons. The UE may monitor additional SSs that carry a MBS PDCCH to avoid affecting unicast performance. Moreover, a wideband operation, when unnecessary, may result in excessive power consumption. For example, for RRC_connected UEs, if there are no unicast activities, should the UE keep the radio front (RF) open to cover the active unicast BWP even if the CFR is smaller than the active unicast BWP? Also, for RRC_idle/inactive UEs, the MBS BWP may be wider than the initial BWP. Consequently, for each monitoring occasion of the MBS PDCCH, a UE switches from an initial BWP to a wider MBS BWP to check the presence of a MBS PDCCH and an associated PDSCH. Such frequent BWP switching may be unnecessary if there are not any MBS transmissions expected.

These issues are more pronounced for reduced capability NR UEs that support MBS due to the constraints on battery life that should last, for example, from a couple of days to several years.

Therefore, there may be a need to design procedures to avoid unnecessary monitoring of a MBS PDCCH when there are no MBS activities, and to adjust the operational bandwidth based on the ongoing activities.

The subject matter disclosed herein provides for RRC_connected UEs, procedures to adopt the monitoring of MBS PDCCH based on the absence or presence of the MBS activities; schemes to detect the absence of MBS activities to stop monitoring MBS activities include a timer-based approach and an explicit indication in a MBS PDCCH, a GC-PDCCH, or a MAC-CE. Additionally, schemes are disclosed to detect the presence of MBS to resume/continue monitoring MBS activities that include an explicit indication of an absence duration of MBS activities after which a UE resumes monitoring MBS activities; using an explicit indication in UE-specific PDCCH either scheduling MBS or regular unicast transmissions/receptions; and an explicit indication in a GC-PDCCH or a MAC-CE.

Further still, procedures are disclosed to adjust bandwidth based on MBS activities that consider the MBS PDCCHs to start/restart an associated unicast BWP inactivity timer and upon expiry of the unicast BWP inactivity timer, a UE may switch to initial/default unicast BWP directly or switch first to a MBS BWP then to a unicast BWP.

For RRC_idle/inactive UEs, procedures are disclosed for a timer-based approach to detect the presence/absence of MBS activities; an explicit indication of the presence/absence of MBS activities by PDCCH of RMSI/OSI or PDSCH of RMSI/OSI; use of paging (paging DCI and/or paging message) to indicate the presence/absence of MBS activities to group of UEs or particular UE; and adoption of a monitored BWP based on the presence/absence of MBS activities.

Additionally, solutions are disclosed for how/whether to count MBS PDCCHs towards a maximum number of PDCCH candidates and the associated non-overlapped CCEs. As part of capability signaling, a UE may indicate the support of such feature.

To address the aforementioned problems, the following embodiments are disclosed for RRC_connected UEs and RRC_idle/inactive UEs.

Throughout the disclosure, unless stated otherwise, when a UE determines the presence of MBS activities, or receives an indication of the presence of MBS activities, the UE may be expected to monitor MBS activities. On the other hand, when a UE determines an absence of MBS activities, or receives an indication of the absence of MBS activities, the UE may be expected to stop monitoring MBS activities.

RRC_Connected UEs
MBS PDCCH Enhancements

Given that the occurrence rate of MBS activities may be different than unicast activities, a UE may adapt the monitoring behavior of the UE for a MBS PDCCH based on a presence/absence of MBS activities. In other words, a UE may stop monitoring the MBS PDCCH when there are no MBS activities, but may continue monitoring legacy PDCCHs based on any provided configurations, e.g., a PDCCH for scheduling/triggering unicast transmission, a group common-PDCCH (GC-PDCCH) that carries a slot format indicator (SFI) indication, interruption indication, cancellation indication, etc.

Figure 5:
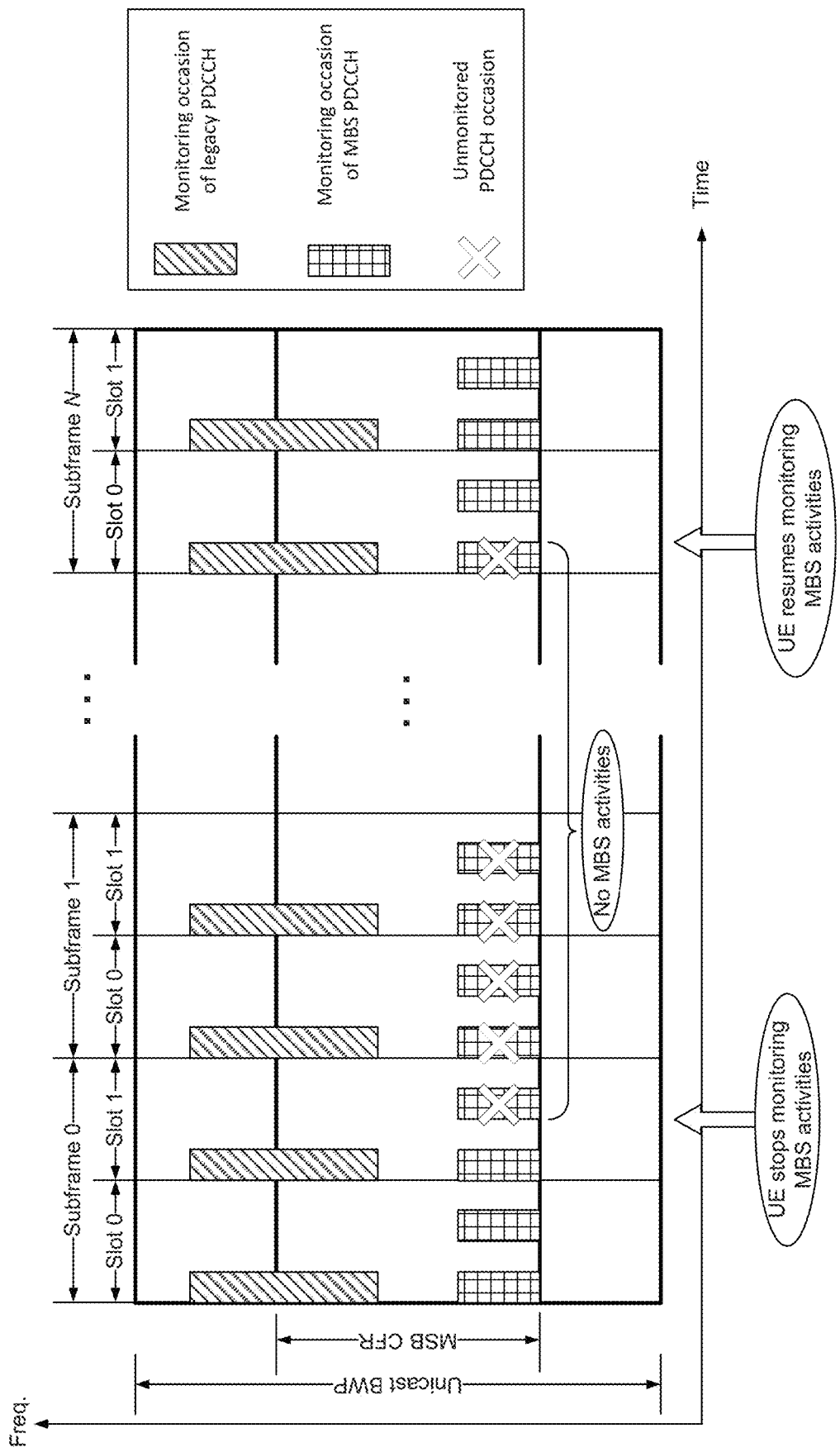
FIG. 5 shows an example of a MBS CFR configured to be confined within an active unicast BWP of a RRC_connected UE according to the subject matter disclosed herein.

FIG. 5 shows an example of a MBS CFR configured to be confined within an active unicast BWP of a RRC_connected UE according to the subject matter disclosed herein. Once a UE determines that there are no MBS activities, the UE may stop monitoring a PDCCH associated with the MBS, but may keep monitoring legacy PDCCHs. When the UE determines a presence of MBS activities, the UE resumes monitoring the MBS PDCCH based on the provided configurations. Details of a determination of the presence/absence of MBS activities is described elsewhere herein.

A MBS CFR refers to a MBS specific BWP or a MBS frequency region having a number of contiguous PRBs. Moreover, a MBS PDCCH refers to a PDCCH that is associated with MBS activities, such as a scheduling dynamic PDSCH for MBS, an activate/deactivate SPS PDSCH for MBS, etc. For example, it may be a GC-PDCCH PDCCH scrambled by a Group-Radio Network Temporary Identifier (G-RNTI), for point-to-multipoint (PTM) scheme 1 or a UE-specific PDCCH for PTM scheme 2. Or it may be GC-PDCCH scrambled by G-CS-RNTI for the activation/deactivation of SPS PDSCH for MBS.

In FIG. 5, a UE stops monitoring the MBS PDCCH when there are no MBS activities. That is, in one embodiment, a UE stops (or resumes) monitoring a MBS PDCCH based on a determination whether MBS activities are absent (or present).

Stop Monitoring MBS PDCCH

A UE may switch from monitoring a MBS PDCCH to skipping monitoring the MBS PDCCH if any of the following conditions (or any of their combination) is satisfied.

A UE may start/restart a timer after the reception of a MBS PDCCH, or a MBS PDSCH, or a unicast PDSCH as a retransmission of a MBS PDSCH. Upon expiry of the timer, the UE may skip monitoring the MBS PDCCH. A gNB may configure a timer through higher-layer signaling, such as a RRC parameter MBS_inactivityTimer, which may be in units of orthogonal domain frequency multiplexing (OFDM) symbols, slots, msec, etc. For example, the RRC parameter MBS_inactivityTimer may be BWP specific and a gNB may provide this parameter as part of a PDSCH-config for MBS, or a PDCCH-config for MBS, or a PDSCH-config/PDCCH-config of a unicast BWP associated with a MBS CFR, etc. Also, a gNB may provide a single MBS_inactivityTimer applicable for all configured BWPs of a serving cell, for example, as part of a PDCCH_servingCell-Config or a PDSCH_servingCellConfig.

In one embodiment, a gNB may configure a UE with a MBS_inactivityTimer in units of OFDM symbols, slots, msec, etc., that may be part of BWP configurations or commonly applied to all configured BWPs. In another embodiment, a UE may stop monitoring a MBS PDCCH upon expiry of the MBS_inactivityTimer.

Figure 6:
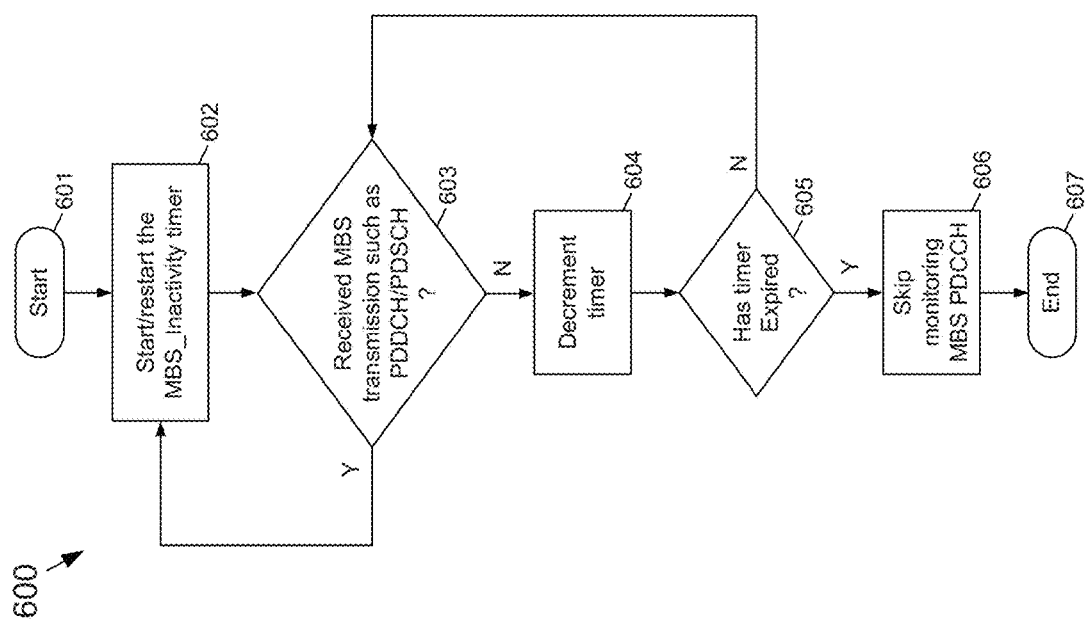
FIG. 6 is a flowchart of an example embodiment of a process for timer-based switching from monitoring to skipping a MBS PDCCH according to the subject matter disclosed herein.

FIG. 6 is a flowchart of an example embodiment of a process 600 for timer-based switching from monitoring to skipping a MBS PDCCH according to the subject matter disclosed herein. The process starts at 601. At 602, a UE starts/restarts a MBS_Inactivity timer. Flow continues to 603, where if the UE receives a MBS transmission as either a PDCCH or a PDSCH for MBS, flow returns to 602, where the UE restarts the timer. If, at 603, the UE does not receive a MBS transmission as either a PDCCH or a PDSCH for MBS, flow continues to 604 where the UE decrements the timer for every OFDM symbol, slot, msec, etc., starting from the last/first symbol of the last received PDCCH/PDSCH for MBS, or starting from the slot/subframe that carried last PDCCH/PDSCH for MBS. Flow continues to 205 where if the timer has not expired, flow returns to 603. If, at 605, the timer has expired, flow continues to 606 where the UE stops monitoring MBS transmission. The process ends at 607.

In one embodiment, the MBS_Inactivity timer is started from the last/first symbol of the last received PDCCH/PDSCH for MBS, or starts from the slot/subframe that carried the last PDCCH/PDSCH for MBS.

Figure 7:
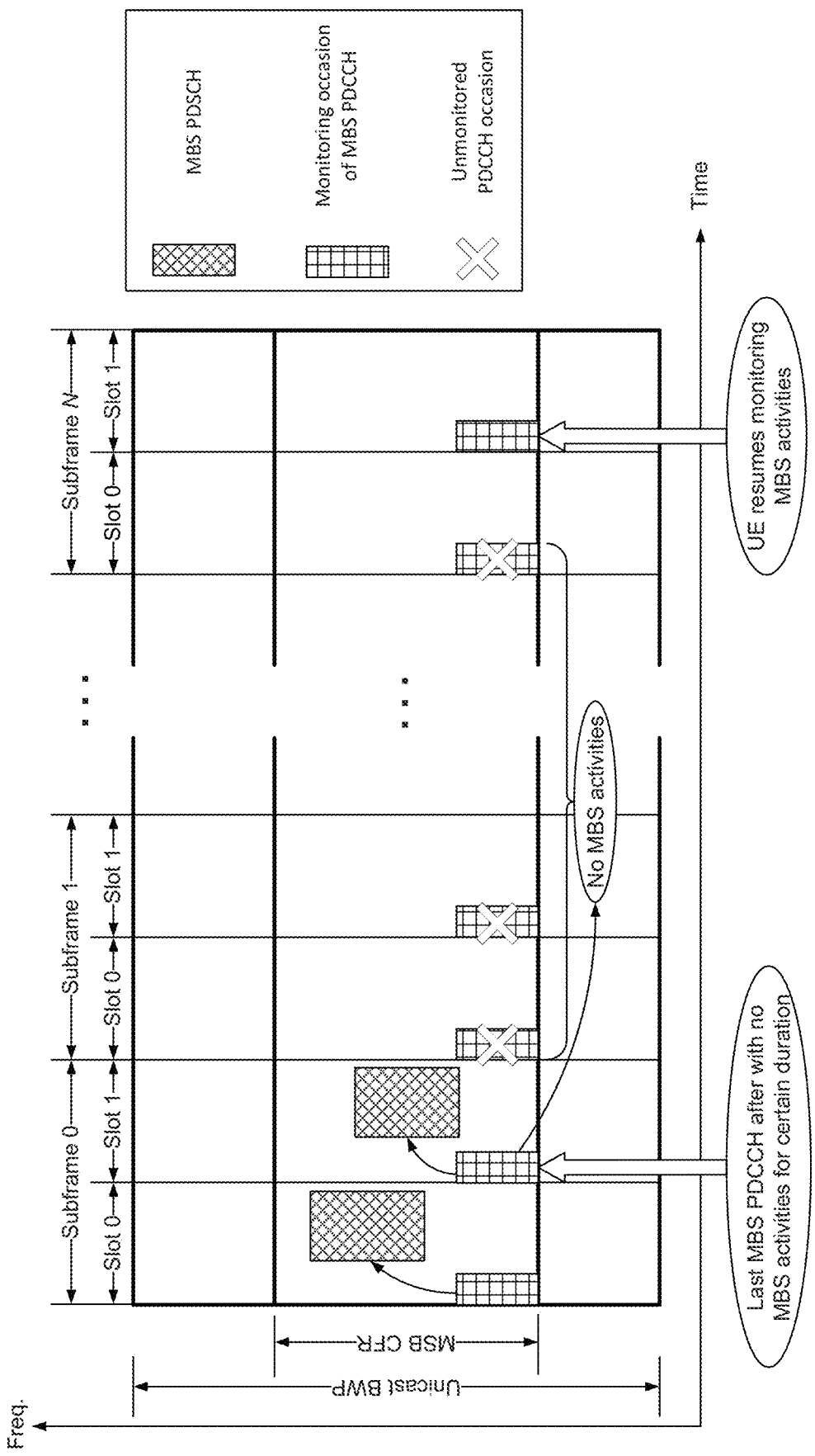
FIG. 7 depicts an example embodiment in which a gNB explicitly indicates to a UE to stop monitoring a MBS PDCCH according to the subject matter disclosed herein.

FIG. 7 depicts an example embodiment in which a gNB explicitly indicates to a UE to stop monitoring a MBS PDCCH according to the subject matter disclosed herein. Moreover, a gNB may configure/indicate a duration of which a UE may skip monitoring the MBS PDCCH. To this end, a gNB may configure a UE through higher-layer signaling with multiple durations of no MBS activities, such as a RRC parameter No_MBS_Duration, which provides a list of possible no MBS activity durations in units of OFDM symbols, slots, subframes, etc. A gNB may use a medium access control-control element (MAC-CE) to indicate which duration should be applied (RRC+MAC-CE) or to down select a smaller list of candidate values and then using a DCI for selection (RRC+MAC-CE+DCI) when the UE receives a MBS PDCCH indicating the absence of MBS activities. Also, a gNB may use a DCI to directly indicate a selected duration of no MBS activities (RRC+DCI) as shown in FIG. 7, for example, in which the $\log_2$ (List size)-bits field is used to indicate which entry has been selected by the gNB. Some entries in the list may be reserved to indicate to a UE to keep monitoring a MBS PDCCH based on the provided configurations, as shown in Table 1, for example. In FIG. 7, the last PDCCH before a no MBS activity duration indicates to the UE a possibility of skipping monitoring of the MBS PDCCH.

TABLE 1

Example list of no MBS activities durations provided by No_MBS_Duration.

| Index | No MBS activities duration |
|---|---|
| 0 | UE keeps monitoring MBS PDCCH based on the provided configurations. |
| 1 | 5 slots |
| 2 | 10 slots |
| 3 | 15 slots |

Instead of providing a UE with a list of possible no MBS durations, a gNB may configure a UE with a single duration. In this case, the gNB may use a 1-bit field in last MBS PDCCH to indicate to the UE whether the UE should keep monitoring MBS PDCCH or skip monitoring.

In one embodiment, a gNB may use a MBS PDCCH to indicate the presence of the absence of MBS activities in the coming duration.

In one embodiment, new fields may be introduced to indicate a presence/absence of MBS activities, or reserved bits may be used, when applicable, or bits may be repurposed from some existing fields. If new DCI formats are introduced for MBS, then new fields may be defined for carrying indications and/or information relating to the presence/absence of MBS activities. If existing DCI formats in NR Rel. 15/16 are used for a MBS PDCCH, some of the reserved bits may be used for such a purpose. For example, DCI format 1_0 scrambled with a C-RNTI has 10 reserved bits that may be used for indications and/or information relating to the presence/absence of MBS activities. Alternatively, some bits of the existing fields may be repurposed to indicate a no MBS activity duration. For example, if the size of a frequency domain resource assignment (FDRA) field is determined based a PRB number of a BWP associated with a MBS CFR, then some of the unused bits of the FDRA field may be repurposed when the bandwidth of a CFR is smaller than bandwidth of an associated unicast BWP. Or, new fields may be introduced in exiting DCI formats, such as DCI 0-1, DCI 0-2, DCI 1-1, DCI 1-2, etc.

To ensure that a UE and a gNB are aligned regarding the monitoring of MBS PDCCH, a UE that may stop monitoring MBS activates after transmitting HARQ-Ack/Nack or not transmitting Nack-only based HARQ to the PDSCH scheduled/triggered by a PDCCH carrying an indication of an absence of MBS activities.

Figure 8:
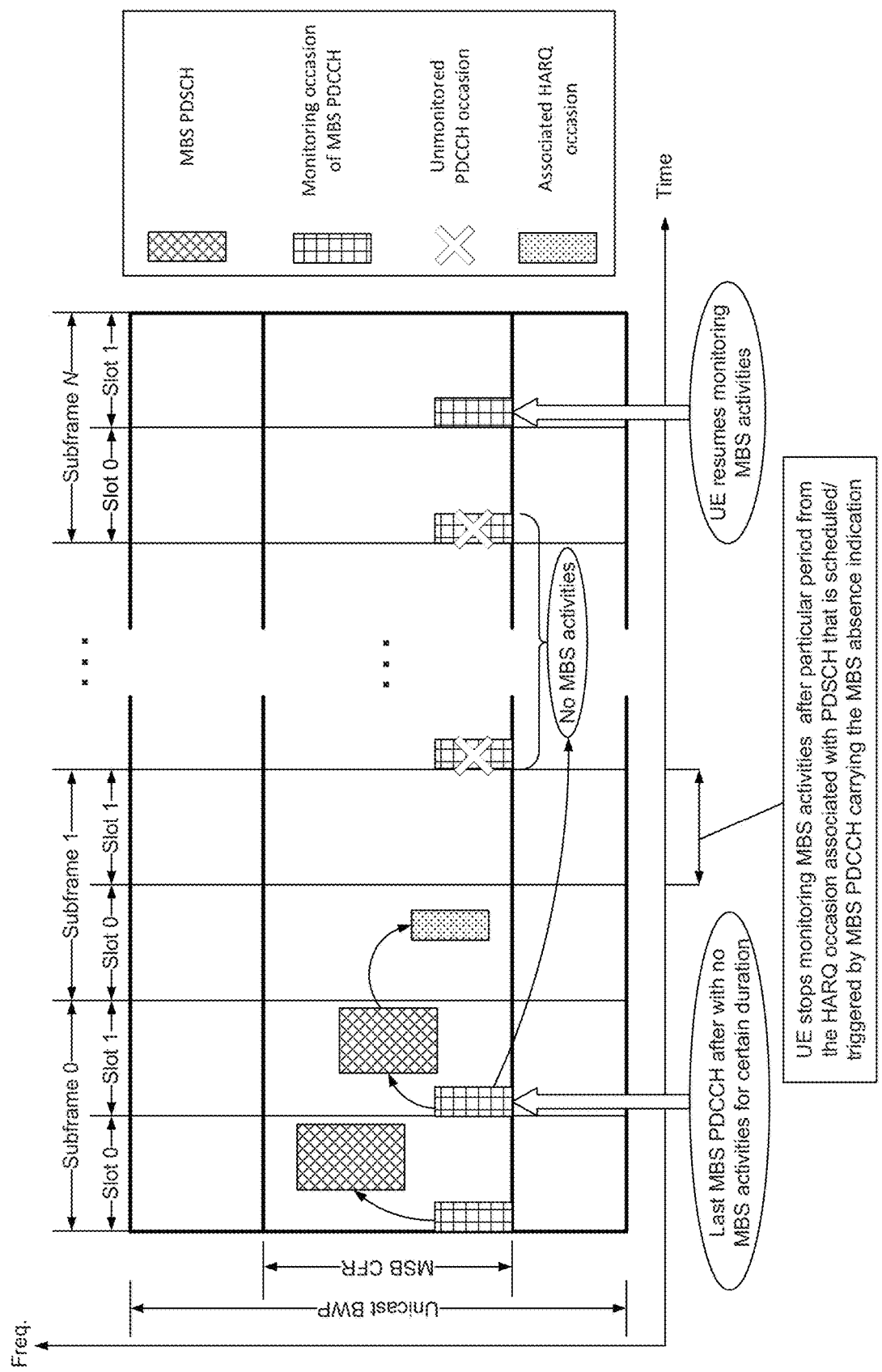
FIG. 8 shows an example of a dynamic MBS PDSCH that is scheduled by a MSB PDCCH carrying an indication of an absence of MBS activities according to the subject matter disclosed herein.

FIG. 8 shows an example of a dynamic MBS PDSCH that is scheduled by a MSB PDCCH carrying an indication of an absence of MBS activities according to the subject matter disclosed herein. In this example, a UE stops monitoring MBS activities after an associated HARQ occasion. The associated HARQ occasion may be an occasion that the UE transmits Ack/Nack for a scheduled PDSCH or transmits Nack only in a case of adopting a Nack-based HARQ. A time period between HARQ occasion and the instant from which the UE stops monitoring MBS activities may be predefined, i.e., provided in the specification, or configured through higher-layer signaling that may be in units of msec, slot, OFDM symbol, subframe, etc. If a UE is not configured to transmit HARQ, then the UE may stop monitoring MBS activities after a particular duration from the reception of the last MBS PDSCH. The duration may be configured through higher-layer signaling.

In FIG. 8, the UE stops monitoring MBS activates after a HARQ occasion associated with a MSB PDSCH that is scheduled/triggered by a PDCCH carrying an indication of an absence of MBS activities.

Additionally, a gNB may use GC-PDCCH, such as DCI 2_0, for example, to indicate the presence/absence and/or the duration of no MBS activities. Through higher-layer signaling, such as the RRC parameter MBS_PresencePerCell, a gNB may indicate the location of a MBS presence field in DCI 2_0 to indicate presence/absence and/or a duration as described earlier when a MBS PDCCH carries this field.

To ensure that a gNB and a UE have a common understanding on MBS activities, a UE may transmit a HARQ-Ack for a GC-PDCCH that carries an indication of an absence of MBS activities. This may be similar to a HARQ-Ack information provided for a SPS PDSCH release command in Clause 10.2 in 3GPP TS 38.213: "Physical layer procedures for control", Rel. 16, V16.4.0. It may be challenging when a GC-PDCCH is addressed to multiple UEs. Therefore, a similar framework to HARQ for a MBS PDSCH may be adopted to avoid a collision between the feedbacks from different UEs. For example, the same indicated PRI may be mapped to different PUCCH rescues through configurations. Different UEs may apply particular shifts either in the time domain or the frequency domain to avoid collision, etc.

A UE may stop monitoring MBS activities after particular period from the reception of GC-PDCCH or from the transmission occasion of HARQ-Ack. The particular period may be configured through higher-layer signaling or predefined, i.e., provided in the specification.

In one embodiment, the time period from the reception of a GC-PDCCH indicating the absence of MBS activities to the instant from which the UE stops monitoring MBS activities may be configured through higher-layer signaling.

In another embodiment, a gNB may transmit a MAC-CE command to indicate the absence of MBS activities; hence a UE may stop monitoring a MBS PDCCH after number of OFDM symbols, slots, subframes, etc., from the first/last symbol/slot of the MAC-CE command. The MAC-CE may also indicate a duration of no MBS activities using one of the methods described above. A MAC-CE may be scheduled by a UE-specific PDCCH. A MAC-Ce may also be scheduled by a GC-PDCCH, such as a PDCCH for a PTM scheme 1.

A UE may transmit a HARQ-Ack/Nack of a MAC-CE command before stopping monitoring MBS activities. A gNB may provide a UE with the time period from the HARQ-Ack/Nack feedback of a MAC-CE PDSCH to the instant from which the UE stops monitoring MSB activities through higher-layer signaling or predefined, i.e., provided in the specification.

In one embodiment, a UE stops monitoring MBS activities based on a MAC-CE indication after particular period from a transmission of HARQ-Ack/Nack of PDSCH carrying a MAC-CE.

All the above embodiments may indicate an absence of MBS activities and/or its duration in another cell. Indication through a GC-PDCCH, such as a DCI 2_0, may inherently realize this by configuring the field location in DCI 2_0 through MBS_PresencePerCell. For other solutions and for a GC-PDCCH indication in general, an additional bit field may be introduced to indicate the carrier index that has no MBS activities for particular period. In one embodiment, a cross carrier indication of the MBS absence may be enabled.

Although in the aforementioned embodiments, a stop monitoring of a MBS PDCCH may be referred to as an event in which a UE does not monitor a MBS PDCCH of a PTM scheme 1 and a MBS PDCCH of a PTM scheme 2. In general, a UE may stop monitoring a MBS PDCCH of a PTM scheme 1, but may keep monitoring a MBS PDCCH of a PTM scheme 2. This may be either predefined, i.e., provided in specification. Alternatively, a gNB may configure a UE through higher-layer signaling to stop monitoring a MBS PDCCH of a PTM scheme 1 only, or both a PDCCH of PTM schemes 1 and 2 when no MBS activities are indicated/detected, which may be controlled by the gNB through higher-layer signaling.

Once a UE determines/receives an indication of the absence of MBS activities, the UE may not be required to receive the MBS PDCCH after a number of OFDM symbols, slots, subframes, etc., from the moment that the UE made such determination or received such an indication or from other particular reference point in time.

In any of the aforementioned embodiments, or any other embodiments to indicate an absence of MBS activities, a gNB may transmit multiple indications of an absence of MBS activities that may be carrying different no MBS activities durations. This may enhance the reliability of such an indication and ensure that a gNB and a UE have a common understanding of the status of MBS activities most of the time. To this end, the same UE may receive multiple indications of the absence of MBS activities and each indication may be carrying different no MBS activities periods. Therefore, a UE may not expect a gNB to shorten the no MBS activities duration. In other words, a gNB may further extend the duration of no MBS activities, but a gNB cannot shorten a duration of no MBS activities.

In the case of reception of multiple no MBS activities indications, a UE may determine the beginning of a no MBS activities duration relative to each received indication separately using any of the aforementioned procedures or any other procedures. The UE may apply a union operation on the indicated no MBS activities durations such that the UE may avoid monitoring MBS activities as much possible to enhance power saving.

Resume/Start Monitoring MBS PDCCH

A UE may resume monitoring a MBS PDCCH, i.e., the UE may switch from not monitoring the MBS PDCCH to normal monitoring of the MBS PDCCH, if any of the following conditions (or any combination thereof) is satisfied.

Figure 9:
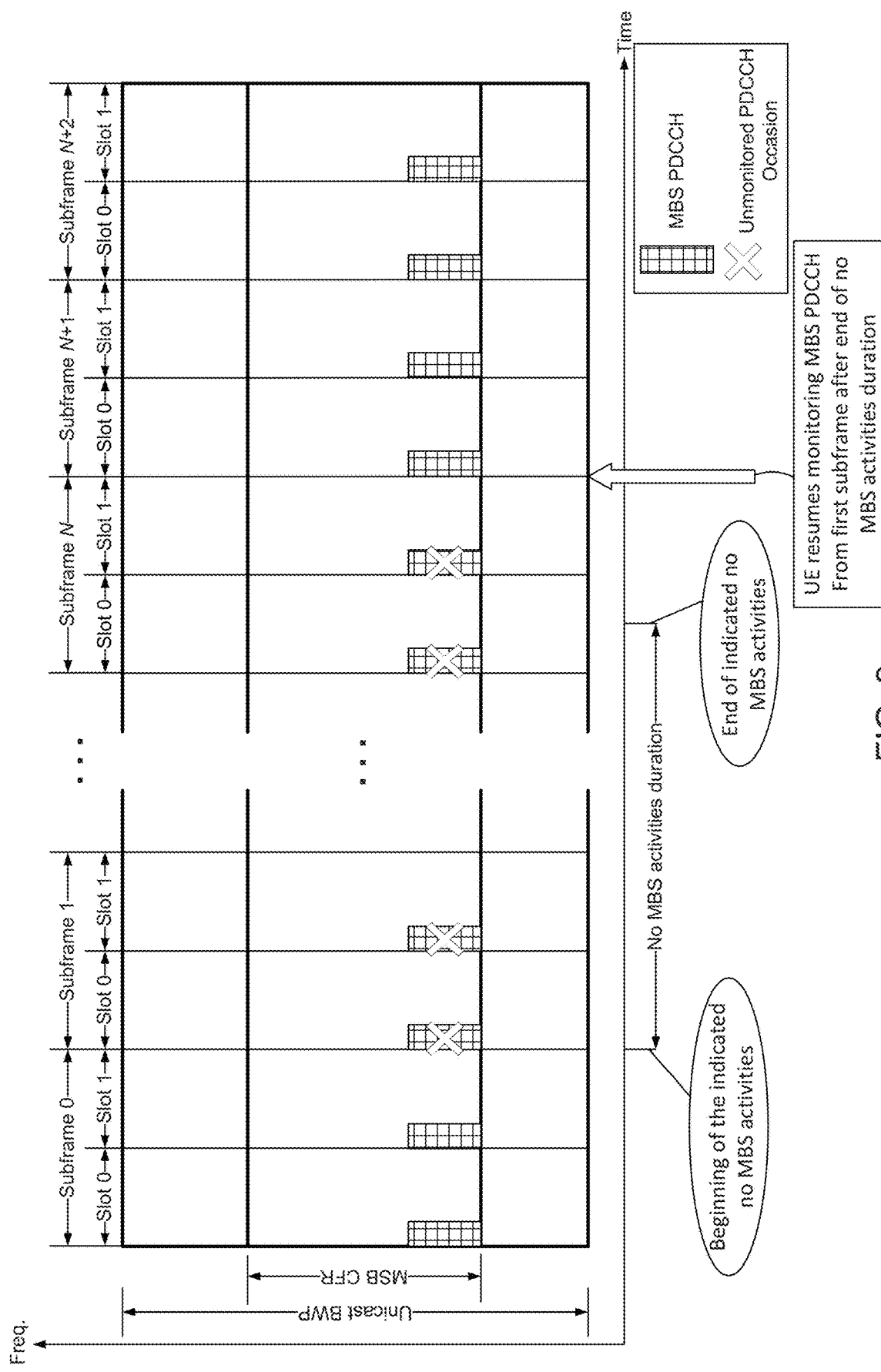
FIG. 9 shows an example embodiment in which a no MBS activities duration ends in Slot 0 of a Subframe N and a UE resumes monitoring a MBS PDCCH starting from Subframe N+1 according to the subject matter disclosed herein.

If a UE is provided with no MBS activities duration through one the aforementioned procedures, or any other procedure, the UE may resume monitoring a MBS PDCCH at the first monitoring occasion of the MBS PDCCH after end of the indicated duration, or starting from first slot, half subframe, subframe, etc., that has monitoring occasion of the MBS PDCCH. FIG. 9 shows an example embodiment in which a no MBS activities duration ends in Slot 0 of a Subframe N and a UE resumes monitoring a MBS PDCCH starting from Subframe N+1 according to the subject matter disclosed herein. The UE skips the monitoring occasion in Slot 1 of Subframe N although it was not initially within the indicated no MBS activities duration. In FIG. 9, the UE resumes monitoring the MBS PDCCH starting from the first subframe after end of no MBS activities duration that has the monitoring occasion of the MBS PDCCH.

To accommodate UE processing, resumption of MBS monitoring may be at least N symbols after the end of the indicated no MBS activities duration in which N may be provided in the specification. This may be similar to search space set group switching in Clause 10.4 in 3GPP TS 38.213: "Physical layer procedures for control", Rel. 16, V16.4.0.

In one embodiment, a UE resumes monitoring a MBS PDCCH after the end of the indicated no MBS activities duration.

In one embodiment, in some occasions a UE may stop monitoring a MBS PDCCH of a PTM scheme 1, but the UE may still monitoring the MBS PDCCH of a PTM scheme 2 or monitoring a UE-specific PDCCH that may still schedule MBS according to a point-to-point (PTP) scheme. In this case, a gNB may use such PDCCHs to indicate the resumption of MBS activities either explicitly or implicitly.

Figure 10:
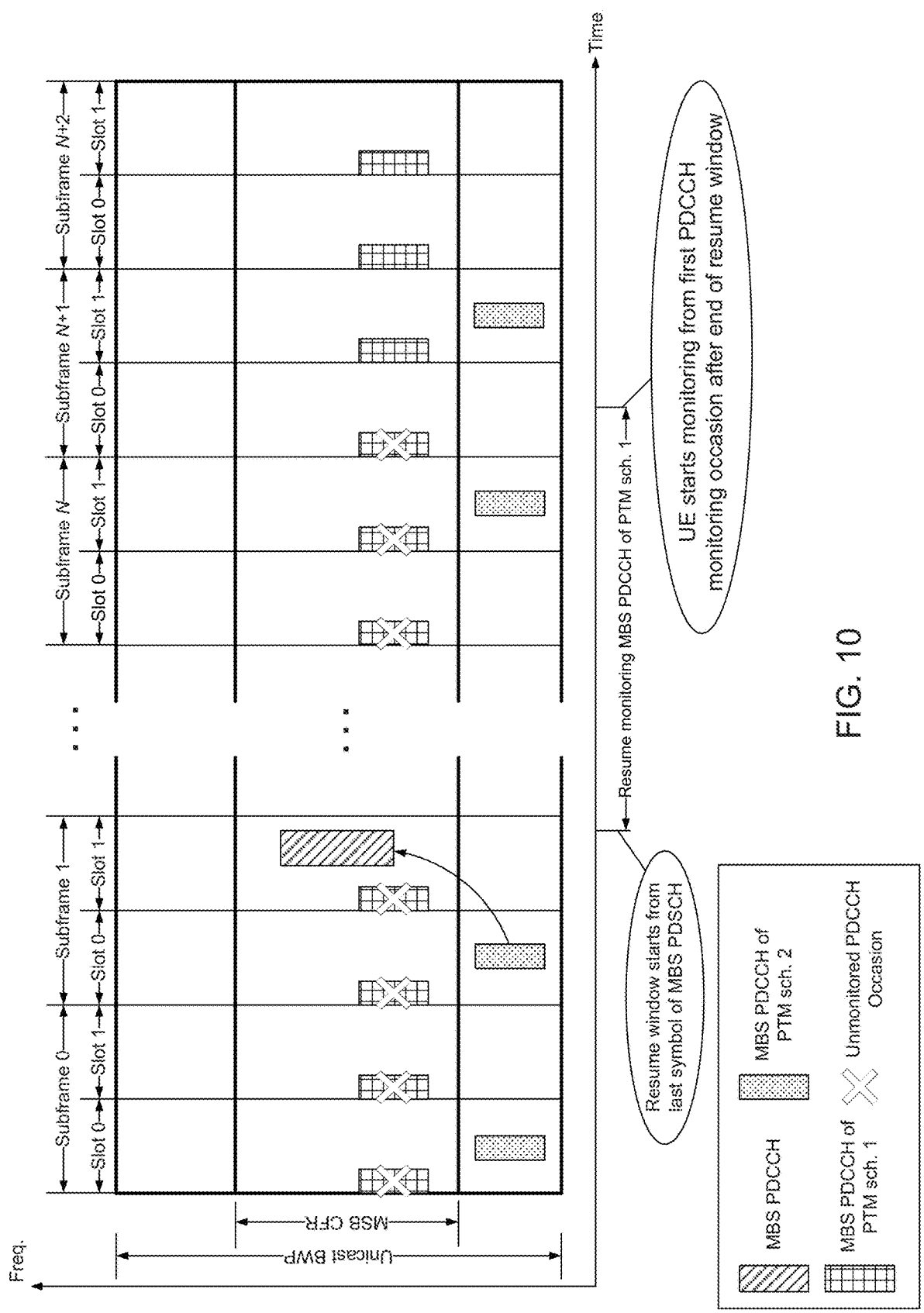
FIG. 10 shows an example in which a UE does not monitor a MBS PDCCH of a PTM scheme 1, but monitors a UE-specific PDCCH for a MBS PTM scheme 2 according to the subject matter disclosed herein.

FIG. 10 shows an example in which a UE does not monitor a MBS PDCCH of a PTM scheme 1, but monitors a UE-specific PDCCH for a MBS PTM scheme 2 according to the subject matter disclosed herein. In the implicit indication, when a UE receives a DL grant for a MBS through a PDCCH of a PTM scheme 2, the UE resumes monitoring the MBS PDCCH of a PTM scheme 1.

A UE may resume monitoring a MBS PDCCH of a PTM scheme 1 after some duration from the reception of another MBS PDCCH, such as a PDCCH of a PTM scheme 2. The duration period may be either predefined, provided in specification, or configured by higher-layer signaling. For example, a gNB may provide a UE with the duration period by a RRC parameter MBS_res_wind that may start from the last OFDM symbol of a scheduled PDSCH according to a PTM scheme 2 to the first slot that has a monitoring occasion of a MBS PDCCH of a PTM scheme 1, as shown in FIG. 10. In general, MBS_res_wind may start from the first/last symbol of a MBS PDCCH of a PTM scheme 2, or from the first/last symbol of a MBS PDSCH scheduled according to a PTM scheme 2, or from the slot, subframe, etc., that contains either a MBS PDCCH of a PTM scheme 2 or a scheduled MBS PDSCH according to a PTM scheme 2.

Moreover, a UE may resume monitoring a MBS PDCCH of a PTM scheme 1 starting from a first slot, subframe, etc., that has a monitoring occasion of a MBS PDCCH of a PTM scheme 1 after the end of resumption window.

The duration of the window may be predefined, i.e., provided in the specification, or configured in units of OFDM symbols, slots, subframes, etc. To accommodate UE processing time, the resumption of monitoring a MBS PDCCH of a PTM scheme 1 may be at least N symbols after the end of resumption window in which N may be provided in the specification. This may be similar to search space set group switching in Clause 10.4 in 3GPP TS 38.213: "Physical layer procedures for control", Rel. 16, V16.4.0.

FIG. 10 shows using a PDCCH of a PTM scheme 2 to implicitly indicate to a UE to resume monitoring a MBS PDCCH of a PTM scheme 1. In one embodiment, a MBS PDCCH of a PTM scheme 2 may be used as an implicit indication so that a UE may resume monitoring a MBS PDCCH of a PTM scheme 1. In one embodiment, a UE resumes monitoring a MBS PDCCH of a PTM scheme 1 after particular duration from the reception of a MBS PDCCH of a PTM scheme 2 or a scheduled PDSCH. The particular duration may be predefined and provided through higher-layer signaling.

Although in the previous example of a PDCCH of a PTM scheme 2 used as an implicit indication for resumption of a PDCCH of a PTM 1, a UE-specific PDCCH scheduling a MBS PDSCH according to a PTP scheme may alternatively or used in addition. For example, if a set of HARQ processes are determined to be used for MBS operation, any of the HARQ processes may be used although a PTP scheme implies that the UE is to resume monitoring of a MBS PDCCH of schemes 1 or 2. Additional details on when resuming monitoring of a PDCCH of a MBS PTM scheme 1 or 2 may be similar to what has been described above.

In one embodiment, a MBS PDCCH of a PTP scheme may be used as an implicit indication so that a UE may resume monitoring a MBS PDCCH of a PTM scheme 1 or 2.

In one embodiment, a gNB may explicitly indicate to a UE to resume monitoring a MBS PDCCH. For example, the explicit indication may be in the form of 1-bit field indicating the presence or absence of MBS activities, i.e., whether the 1-bit field is set to one/zero, the UE may be expected to monitor/skip monitoring a MBS PDCCH. The 1-bit field may be provided in a UE-specific PDCCH for a unicast transmission or a MBS transmission, or a GC-PDCCH. The presence/absence of the 1-bit field in a PDCCH may be predefined, provided in the specification, or configured by higher-layer signaling. For example, for a UE-specific PDCCH, a RRC parameter, such as MBS_Status_in_DCI-1-0, may indicate the whether the 1-bit is present in DCI 1-0. If present, any received DCI 1_0 carries this field. If the field is set to one, this means that a UE is to resume/start monitoring a MBS PDCCH. Some of the reserved bits, if available, may be used for this field. Or, by repurposing some bits in the existing DCI formats. For example, if MBS_Status_in_DCI-1-0 is set to true, then the most significant bit of the FDRA field may be repurposed for a MBS status indication. Or, a new field may be introduced in the existing DCI formats, such as DCI 0-1, DCI 0-2, DCI 1-1, DCI 1-2, etc.

For a GC-PDCCH, such as DCI 2_0, higher-layer signaling may indicate the position of the field in the DCI, such as a RRC parameter MBS_Status_Position_in_DCI-2-0. Also, such an indication may be used to indicate the status of MBS in other CCs. For example, if DCI 1-0 is used for cross carrier scheduling, then the 1-bit field indicates the MBS status in the new carrier in which the grant is provided.

Alternatively, the 1-bit field that indicates the MBS status may indicate the status of MBS in CC in which a PDCCH is received, regardless whether a cross carrier scheduling is used. Yet another embodiment may include a dedicated field to indicate the carrier index for which the 1-bit indicating the MBS status is applicable. Although in the previous examples, a 1-bit field is used to indicate the presence of MBS activities such that a UE may resume monitoring a MBS PDCCH, the 1-bit field may also be used to indicate an absence of a MBS PDCCH such that the UE may stop monitoring the MBS PDCCH.

A similar timeline to what has been disclosed herein may be applied for a UE to start monitoring a MBS PDCCH. In one embodiment, an explicit indication may be used to indicate the presence or absence of MBS activities. In one embodiment, a 1-bit field may be introduced in a UE-specific PDCCH (for MBS or non-MBS activities) or in a GC-PDCCH to indicate the presence or absence of MBS activities. In one embodiment, a presence of such a 1-bit field may be configurable through higher-layer signaling.

In the case of using a UE-specific PDCCH used to indicate the absence of MBS activities, similar to the aforementioned embodiments, a UE-specific PDCCH may indicate additional information, such as an absence duration of MBS activities. Also, a similar framework may be applied to ensure that a gNB and a UE have a common understanding of the status of MBS activities. Embodiments, such as stop monitoring MBS activities after transmitting a HARQ-Ack/

Nack of a PDSCH scheduled, the PDCCH carrying the absence indication of MBS activities may be applied as well.

In one embodiment, a gNB may use a MAC-CE to indicate the presence of MBS activities such that a UE may resume/start monitoring MBS PDCCH. The gNB may use a MAC-CE to indicate the absence of MBS activities such that a UE may stop monitoring a MBS PDCCH. A similar timeline to what has been disclosed herein may be applied for a UE to start monitoring a MBS PDCCH. In one embodiment, a MAC-CE may indicate the absence or the presence of MBS activities such that a UE may stop or may monitor a MBS PDCCH.

Wideband Operation Enhancements

The embodiments disclosed in this section are intended to address wideband operations issues for RRC_connected UEs when a CFR is defined as a MBS BWP, denoted as Option 2A, or a CFR is defined as contiguous PRBs within a dedicated unicast BWP, denoted as Option 2B.

CFR not MBS BWP (Option 2B)

In NR Rel. 15/16, a UE starts/restarts a BWP-Inactivity-Timer, if the UE receives a PDCCH scrambled with a C-RNTI or a CS-RNTI indicating downlink assignment or uplink grant in the active BWP or a MAC PDU is received in a configured downlink assignment. Since a CFR in Option 2B is defined as part of a unicast BWP, reception of a MBS PDCCH may start/restart the unicast BWP-InactivityTimer. For example, for a PTM scheme 1, the reception of a PDCCH scrambled with a G-RNTI may start/restart the BWP-InactivityTimer of the BWP containing a CFR. For a PTM scheme 2 or a PTP scheme in which a UE-specific PDCCH is transmitted, reception of a PDCCH either scrambled with a C-RNTI or any new UE-specific RNTI defined for MBS may start/restart the BWP-InactivityTimer of the BWP containing CFR. Moreover, similar to legacy, the reception of MAC PDU in a configured downlink assignment for multicast may start/restart the unicast BWP-InactivityTimer. In one embodiment, reception of a MBS PDCCH of a PTM scheme 1, or a PTM scheme 2 or a PTP scheme starts/restarts BWP-InactivityTimer of BWP containing CFR.

To provide a gNB with flexibility, a gNB may configure which MBS PDCCH may start/restart the BWP-Inactivity-Timer of the BWP containing a CFR. This may be beneficial in some scenarios. For example, if a gNB uses a PTM scheme 1 to schedule a low-priority MBS transmission while a PTM scheme 2 for a high-priority MBS transmission, then a UE may start/restart the BWP-InactivityTimer of the BWP containing the CFR upon the reception of a PDCCH according to a PTM scheme 2, not a PTM scheme 1. In other words, it may be more beneficial for the UE to switch to narrow initial/default BWP for power saving, rather than staying in a currently active BWP to receive low-priority MBS scheduled with a PTM scheme 1. In that case, a gNB may configure a UE through higher-layer signaling that a MBS PDCCH can start/restart the unicast BWP-InactivityTimer of the BWP containing the CFR. For example, setting a RRC parameter, such as PTM-Scheme1_BWP-Timer, to "true" may indicate that the reception of MBS PDCCH of a PTM scheme 1 may start/restart the BWP-InactivityTimer of the BWP containing CFR. Although this example focuses on a MBS PDCCH of a PTM scheme 1, it may be applied for other MBS PDCCHs as well.

One embodiment provides that a gNB through higher-layer signaling may indicate whether reception of a MBS PDCCH may start/restart the BWP-InactivityTimer of the BWP containing a CFR. As yet another embodiment, a gNB may configure a UE with a MBS_inactivityTimer, and provide the UE with the value for the timer through higher layer signaling, or predefined, i.e., provided in the specification. If not configured, a UE may set the value of the MBS_inactivityTimer to be the same as the value of the BWP-InactivityTimer of an associated unicast BWP.

A UE may start/restart the MBS_inactivityTimer following similar rules of starting/restarting the BWP-Inactivity-Timer of an associated unicast BWP with replacement of "PDCCH addressed C-RNTI or CS-RNTI" with the MBS PDCCH, e.g., the MBS PDCCH of a PTM scheme 1, or a PTM scheme 2 or a PTP scheme. If the MBS_inactivity-Timer of the associated unicast BWP expires, but the MBS_inactivityTimer is still running, a UE does not switch to the initial/default BWP. Note that the disclosed embodiments may be extended and applied for the case in which multiple CFR regions are configured within a BPW. In this case, each CFR region may have dedicated timer.

CFR is MBS BWP (Option 2A)

When a CFR is defined as an MBS-specific BWP that is associated with the dedicated unicast BWP, the MBS BWP may not have a dedicated BWP-InactivityTimer. Instead, only the BWP-InactivityTimer of the associated active unicast BWP is running.

Figure 11:
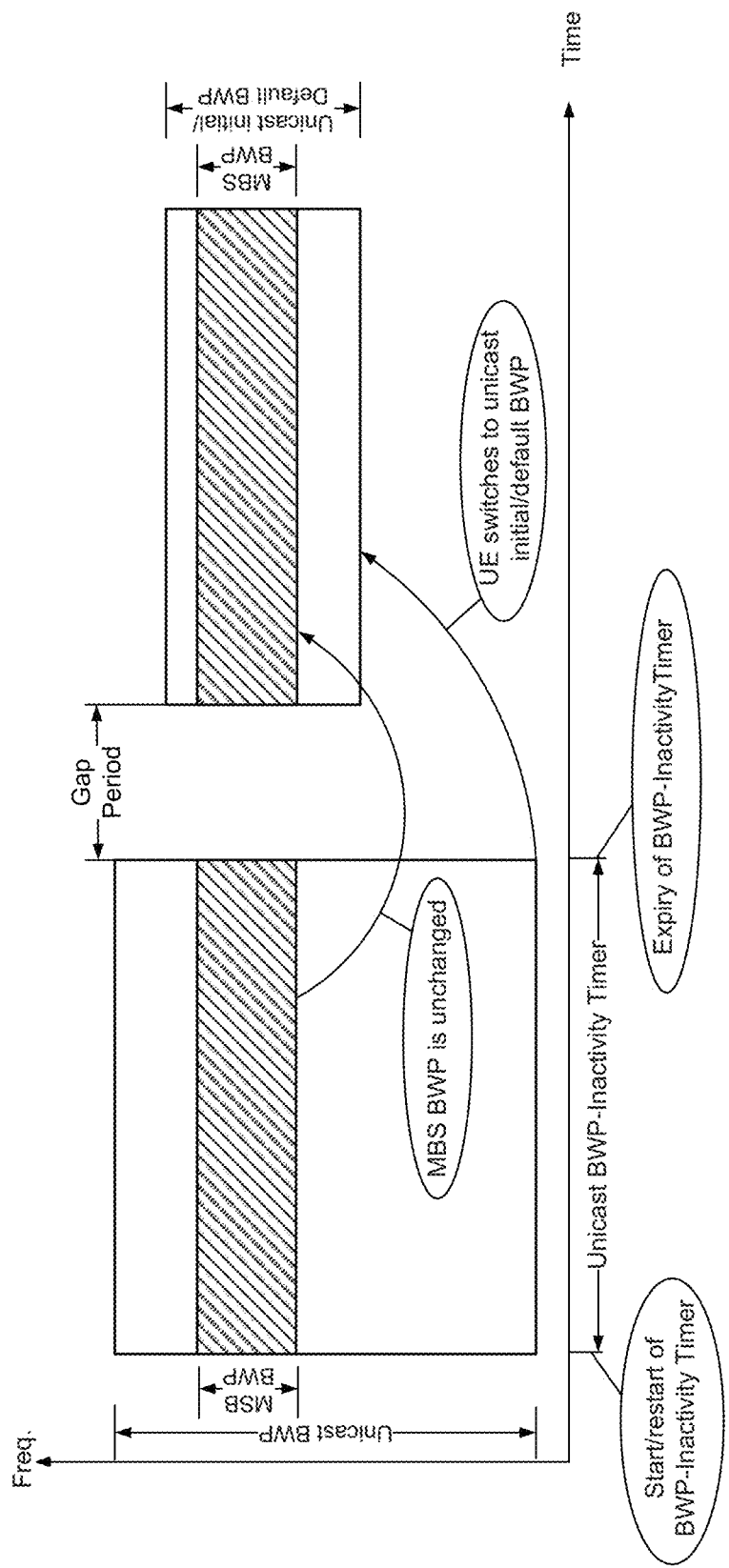
FIG. 11 depicts a scenario in which a MBS BWP is confined within both a unicast active BWP and a unicast initial/default BWP according to the subject matter disclosed herein.

FIG. 11 depicts a scenario in which a MBS BWP is confined within both a unicast active BWP and a unicast initial/default BWP according to the subject matter disclosed herein. Therefore, upon expiry of the unicast BWP-Inactivi-tyTimer, a UE switches from a unicast active BWP to a unicast initial/default BWP. The MBS BWP, however, remains unchanged.

Figure 12:
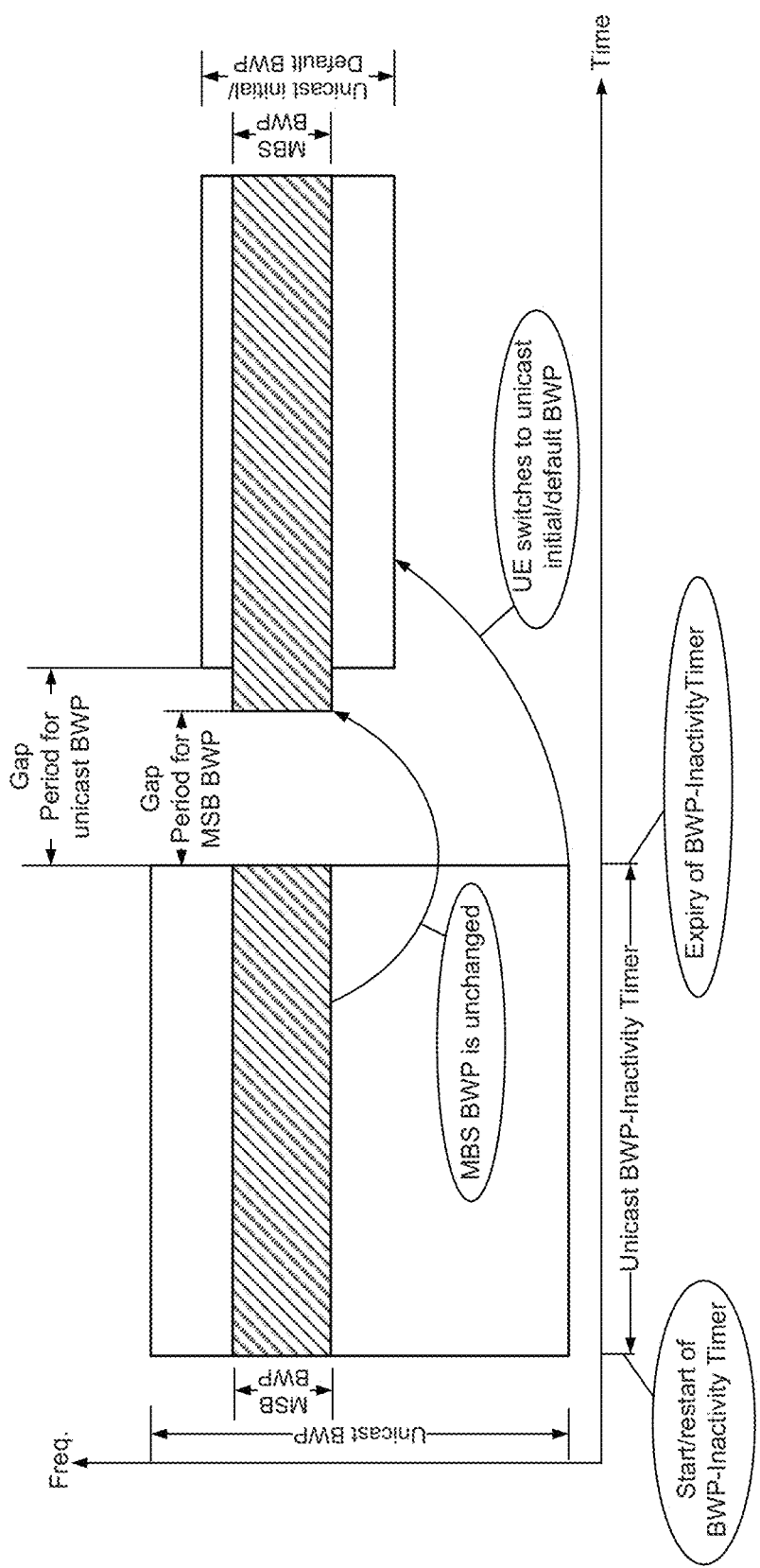
FIG. 12 shows a scenario in which a UE switches to a unicast initial/default BWP and the UE may start reception/transmission on a MBS BWP before a unicast initial/default BWP according to the subject matter disclosed herein.

Although a MBS BWP may be unchanged due to switching of the unicast BWP, a UE may still not be required to receive any MBS PDCCH/PDSCH or transmit any UL related to MBS activities for a certain period of time, called a gap period in FIG. 11, for example. The period duration may be similar to a silence period defined in Clause 12 in 3GPP TS 38.213: "Physical layer procedures for control", Rel. 16, V16.4.0, i.e., a UE is not required to receive or transmit in the cell during a time duration from the beginning of a subframe for FR1, or of half of a subframe for FR2, that is immediately after the BWP inactivity timer expires until the beginning of a slot in which the UE may receive or transmit. It may, however, be different in general. For example, a UE may be able to transmit/receive on MBS BWP earlier than the unicast initial/default BWP as shown in FIG. 12. FIG. 12 shows a scenario in which a UE switches to a unicast initial/default BWP and the UE may start reception/transmission on a MBS BWP before a unicast initial/default BWP according to the subject matter disclosed herein. The gap period of MBS BWP may be zero, i.e., the UE is able to receive and transmit on MBS BWP that switching to unicast initial/default BWP.

In one embodiment, upon expiry of a unicast BWP-InactivityTimer, if a MBS BWP is confined in both a unicast activate BWP and an initial/default BWP, a UE switches to the initial/default BWP and keep MBS without changes.

In one embodiment, a gap period may be introduced in a MBS BWP in which a UE cannot transmit or receive. It may be equal to or different from the needed gap duration when switching from unicast active BWP to unicast initial/default BWP.

Although in previous examples BWP switching may be triggered by expiration of the unicast BWP-InactivityTimer, a same approach may be extended when BWP switching is triggered due to reception of a DCI format with a BWP indicator field that indicates a BWP change.

A similar procedure may be applied for a case when a CFR is defined as a MBS region with contiguous PRBs within a dedicated unicast BWP. Specifically, if a CFR (as a MBS region) is fully confined within the initial/default BWP, a UE may continue monitoring the CFR (as a MBS region) after switching to the initial/default BWP. Although a CFR (as a MBS region) is unchanged, a similar gap period may be used in which a UE cannot receive or transmit anything related to MBS activities.

In one embodiment, upon the expiry of a unicast BWP-InactivityTimer, if a CFR (as a MBS region) is fully confined in both a unicast activate BWP and an initial/default BWP, a UE switches to the initial/default BWP and keeps the CFR without changes.

In one embodiment, a gap period may be introduced for MBS activities in which a UE cannot transmit or receive. The gap period may be equal to or larger than the needed gap duration when switching from a unicast active BWP to a unicast initial/default BWP.

In one embodiment, the gap period for MBS activities may not be shorter because a UE cannot monitor a CFR (as a MBS region) outside the active initial/default BWP.

In one embodiment, if a CFR (as a MBS region) is not confined within the initial/default BWP, a UE may not be expected monitor any MBS activities when the UE switches to the initial/default BWP or any other BWP.

For a CFR defined as a MBS region, when a UE switches to the initial/default BWP, or any other unicast BWP, the UE may expect that the new BWP contains a new CFR that confines the old CFR in which both have the same start PRB. Otherwise, the UE does not expect to monitor a MBS PDCCH of a scheme 1 because the same FDRA field is indicated to all UEs in the same MBS group and the UEs may not be able to have the same interpretation. In this case (the beginning of the new CFR totally differs from an old CFR, but there is still some overlapping), a gNB may use a PTM scheme 2 in which a UE-specific PDCCH points to a GC-PDSCH and to compensate to the difference between the old CFR and new CFR regions.

Figure 13:
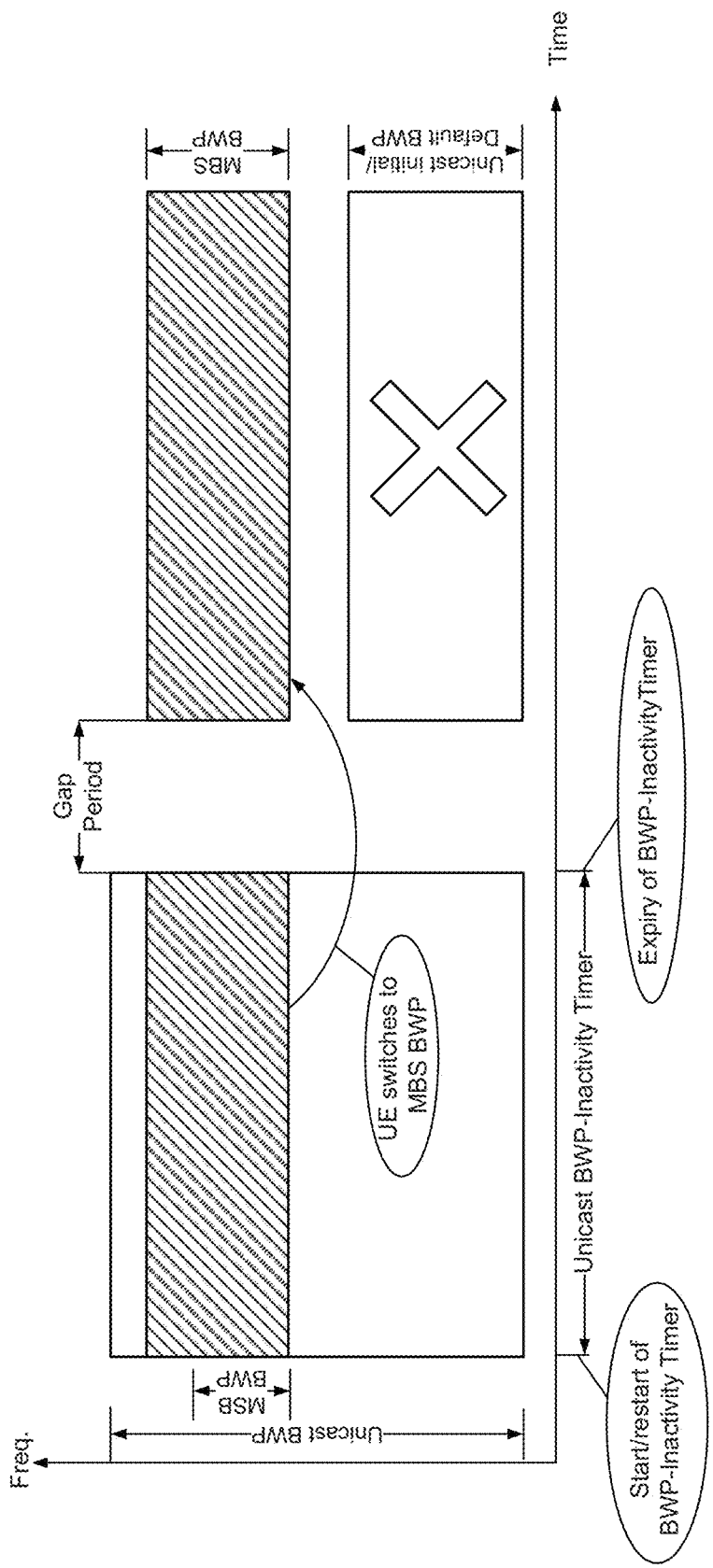
FIG. 13 depicts a UE switching to a MBS BWP upon expiry of the unicast BWP-InactivityTimer, not the unicast initial/default BWP if the initial/default BWP does not contain MBS BWP according to the subject matter disclosed herein.

On the other hand, if a MBS BWP is not confined within the unicast initial/default BWP, a UE switches to a MBS BWP instead of the unicast initial/default BWP when the unicast BWP-InactivityTimer expires, as shown in FIG. 13, for example. A gap period in which no reception or transmission may be needed, as described above. That is, FIG. 13 depicts a UE switching to a MBS BWP upon expiry of the unicast BWP-InactivityTimer, not the unicast initial/default BWP if the initial/default BWP does not contain MBS BWP according to the subject matter disclosed herein.

In one embodiment, upon expiry of the unicast BWP-InactivityTimer, if a MBS BWP is not confined in both a unicast activate BWP and an initial/default BWP, a UE switches to the MBS BWP, not the initial/default BWP.

As yet another embodiment, instead of indefinitely monitoring a MBS BWP after expiry of the unicast BWP-InactivityTimer (at least until the reception reconfigurations or DCI indicating BWP switching), the UE may start decrementing another configured timer, called a MBS_Timer, for example. Upon expiry of the MBS_Timer, the UE may switch to the unicast initial/default BWP.

A UE may derive the value of the MBS_Timer from the value of the unicast BWP-InactivityTimer. For example, a UE may apply particular scaling factor that may be predefined, provided in the specification. Alternatively, a gNB may provide a UE with the value of the MBS_Timer through higher-layer signaling, such as a RRC parameter MBS_Timer_value. The MBS_Timer may be in units of OFDM symbols, slots, subframes, etc. For example, the MBS_Timer_value may be provided as part of a ServingCellConfig IE, or any new IE introduced to provide MBS configurations.

A UE may start decrementing the MBS_Timer upon switching from the unicast active BWP to MBS BWP, or when the UE is able to transmit/receive on a MBS BWP. A UE may restart the MBS_Timer when receiving any MBS PDCCHs or legacy PDCCHs on the active MBS BWP. When the MBS_Timer expires, a UE may switch to a unicast initial/default BWP.

A gap period for switching between a unicast active BWP to a MBS BWP, and then from a MBS BWP to a unicast initial/default BWP may be equal or may be different. The values may be predefined, provided in the specification, or configured through higher-layer signaling.

Figure 14:
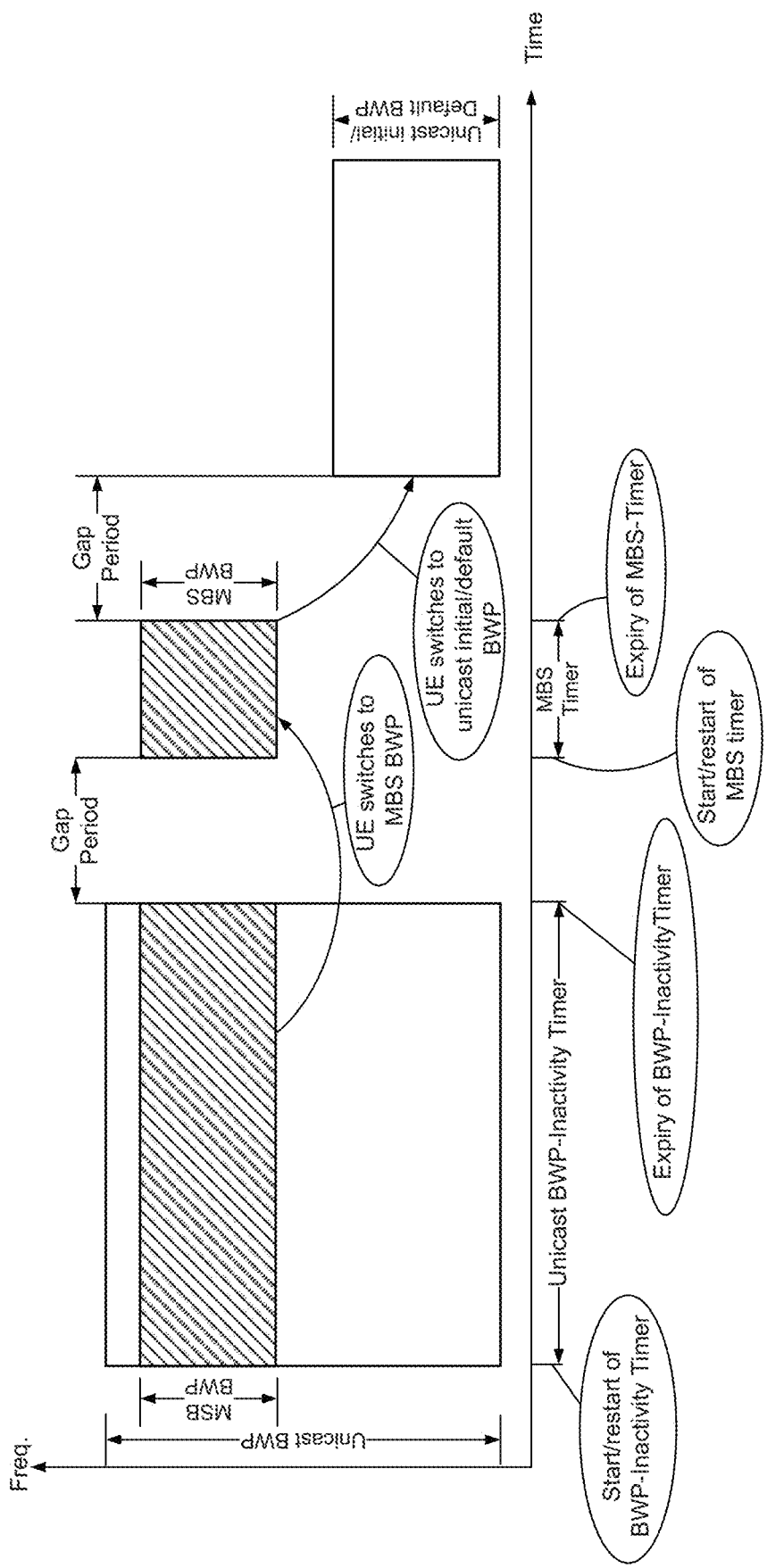
FIG. 14 depicts a UE switching to a MBS BWP upon expiry of a unicast BWP-InactivityTimer and then switching to the unicast initial/default BWP according to the subject matter disclosed herein.

FIG. 14 depicts an example of the aforementioned procedure. In particular, FIG. 14 depicts a UE switching to a MBS BWP upon expiry of a unicast BWP-InactivityTimer and then switching to the unicast initial/default BWP according to the subject matter disclosed herein.

In one embodiment, upon expiry of the unicast BWP-InactivityTimer, if a MBS BWP is not confined in both a unicast activate BWP and an initial/default BWP, a UE switches to the MBS BWP and starts the MBS_Timer. Upon expiry of the MBS_Timer, a UE switches from a MBS BWP to a unicast initial/default BWP.

In one embodiment, a gNB may provide through higher-layer signaling a UE with a value of the MBS_Timer. In one embodiment, a UE (re)restarts the MBS_Timer upon the reception of a MBS PDCCH or a legacy PDCCH in a MBS BWP.

Figure 15:
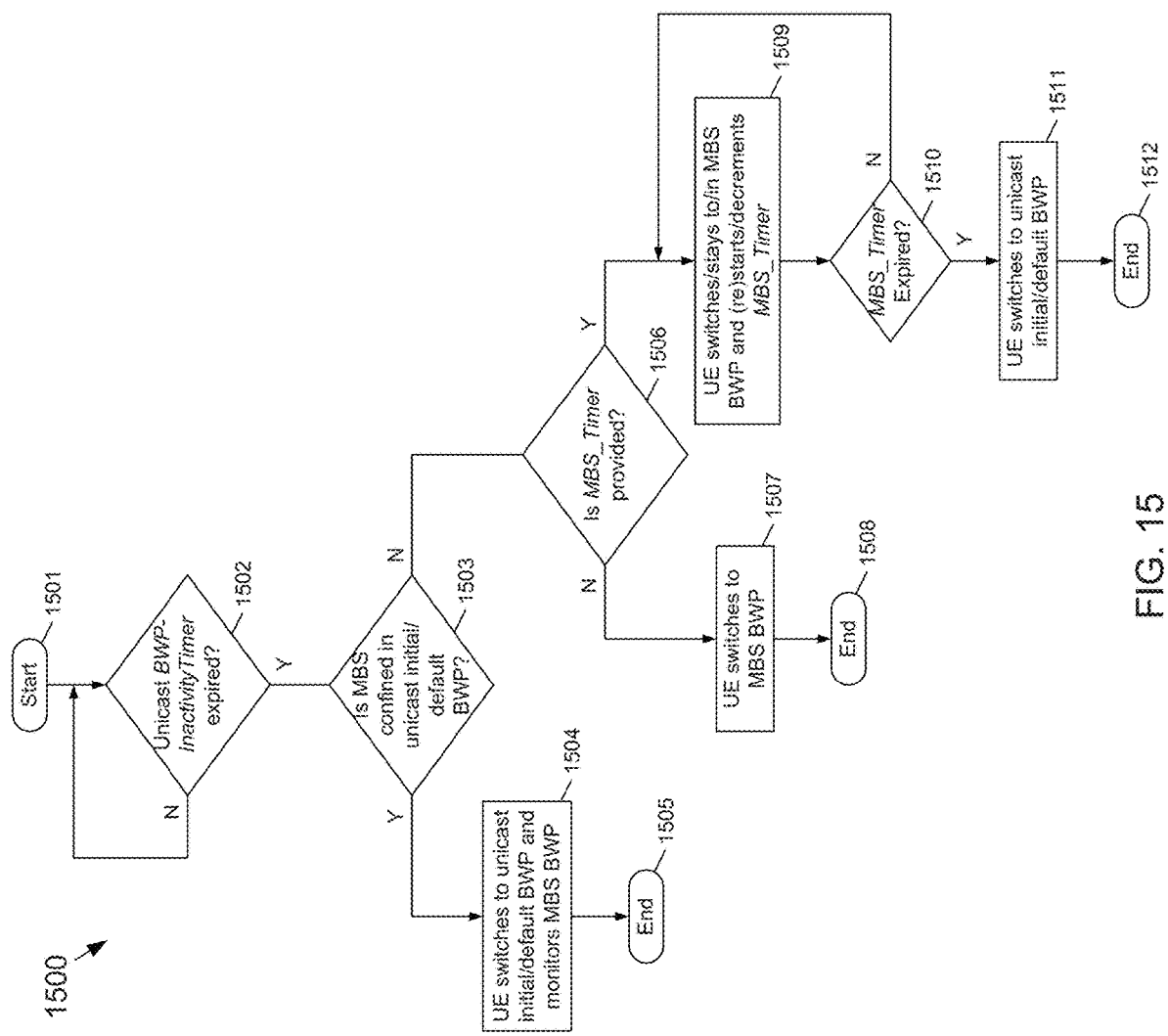
FIG. 15 shows a flow chart of an example process of performed by a UE when the unicast BWP-InactivityTimer expires according to the subject matter disclosed herein.

FIG. 15 shows a flow chart of an example process 1500 of performed by a UE when the unicast BWP-Inactivity-Timer expires according to the subject matter disclosed herein. Basically, the behavior depends on whether a MBS BWP is confined with the unicast initial/default BWP. Also, the behavior of the UE depends on whether the MBS_Timer is provided/specified or not. The process 1500 starts at 1501. At 1502, the UE determines whether the unicast BWP-InactivityTimer has expired. If not, flow remains at 1502. If so, flow continues to 1503 where the UE determines whether the MBS CFR/BWP is confined within the unicast initial/default BWP? If so, flow continues to 1504 where the UE switches to the unicast initial/default BWP and monitors MBS CFR/BWP. Flow continues to 1505 where the process ends. If at 1503, is the UE determines that the MBS CFR/BWP is not confined within the unicast initial/default BWP, flow continues to 1506 where it is determined whether a MBS_Timer has been provided. If not, flow continues to 1507 where the UE switches to the MBS CFR/BWP. Flow continues to 1508 where the process ends. If, at 1506, it is determined that a MBS_Timer has been provided, flow continues to 1509 where the UE switches to/stays in the MBS CFR/BWP and (re)starts/decrements the MBS_Timer. Flow continues to 1510 where the UE determines whether the MBS_Timer has expired. If no, flow returns to 1509. If so, flow continues to 1511 where the UE switches to the unicast initial/default BWP. Flow continues to 1512 where the process ends.

In another embodiment, when a UE receives a MBS PDCCH in a MBS BWP or outside a MBS BWP, but in the associated active unicast BWP (such as a PTM scheme 2), the UE may start/restart the BWP-InactivityTimer of the unicast BWP associated with the MBS BWP. This may avoid early switching of the active unicast BWP upon expiry of the BWP-InactivityTimer if the timer may only be restarted by the reception of a PDCCH in a unicast BWP and not a MBS PDCCH in a MBS BWP when the current active BWP is the unicast BWP contains the MBS BWP. For example, for a PTM scheme 1, reception of a PDCCH scrambled with a G-RNTI may start/restart the BWP-InactivityTimer of the unicast BWP associated with the MBS BWP and so on for a PTM scheme 2 and a PTP scheme.

In one embodiment, reception of a MBS PDCCH of a PTM scheme 1, or a PTM scheme 2 or a PTP scheme starts/restarts the BWP-InactivityTimer of the unicast BWP associated with a MBS BWP.

Although the previous examples show a case in which only one MBS BWP is associated a unicast MBS BWP, in general, there may be multiple MBS BWPs associated with the same unicast BWP. All the aforementioned embodiments may be directly extended to cover this case as well. Note that having multiple MBS BWP may be beneficial if a UE receives multiple MBS services with different UE groups.

Figure 16:
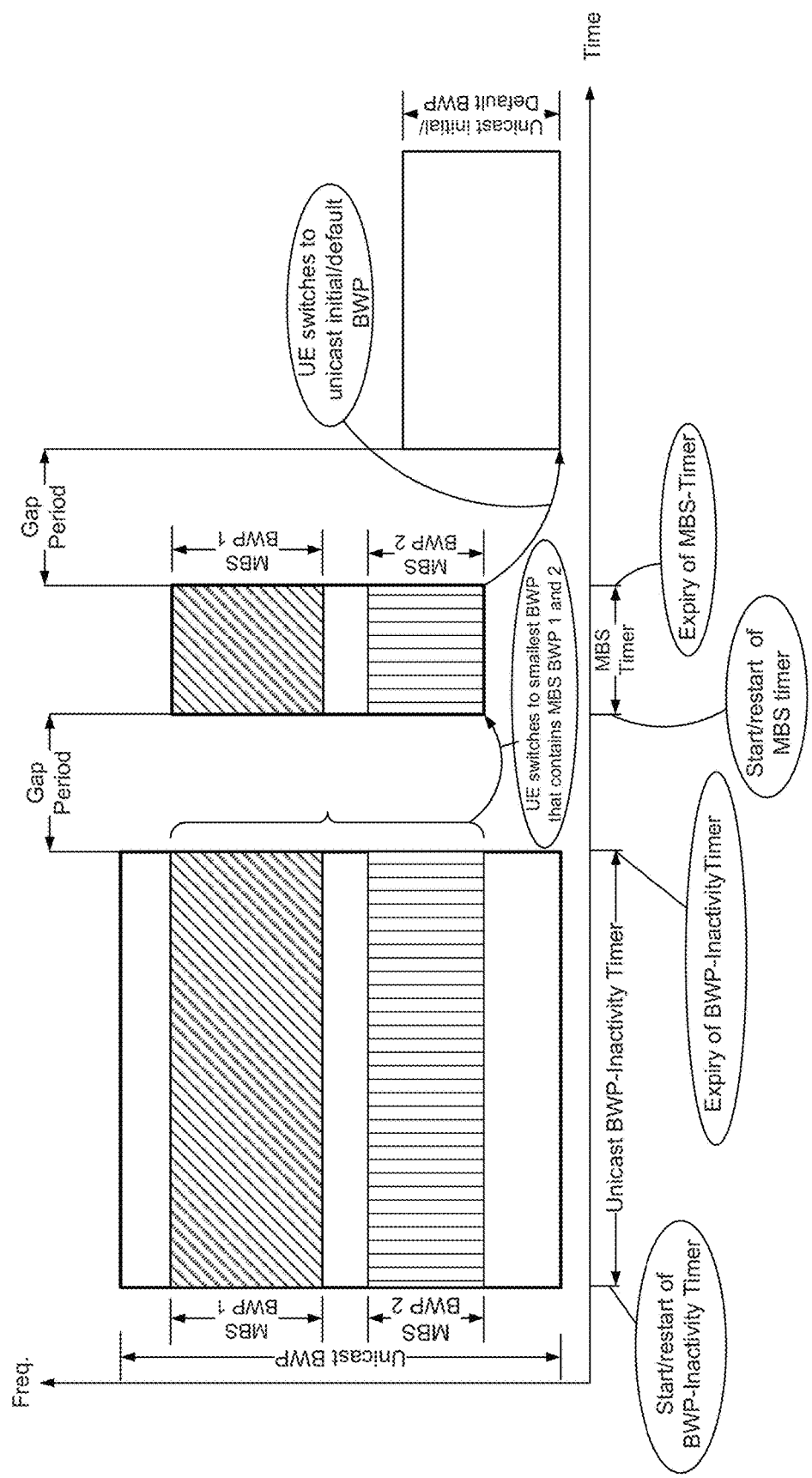
FIG. 16 depicts an example scenario in which a UE is configured with two MBS BWPs and the BWP-InactivityTimer expires and the UE switches to the smallest BWP that contain both MBS BWPs according to the subject matter disclose herein.

FIG. 16 depicts an example scenario in which a UE is configured with two MBS BWPs and the BWP-InactivityTimer expires and the UE switches to the smallest BWP that contain both MBS BWPs according to the subject matter disclose herein. Upon expiry of the unicast BWP-InactivityTimer, a UE switches to the smallest BWP that contains a MBS BWP 1 and a MBS BWP 2. In this example, one MBS-Timer is applied to both MBS BWPs, i.e., the UE starts/restarts the MBS-Timer due to the reception of a MBS PDCCH or a legacy PDCCH in either the MBS BWP 1 or the MBS BWP 2. Otherwise, a UE decrements the MBS-Timer until the timer reaches zero. Once the timer has expired, the UE switches to the unicast initial/default BWP.

A UE may be configured with a dedicated MBS-Timer for each of multiple MBS BWP. Upon expiry of any of the timers, the UE further shrinks, or reduces, the active BWP and switches to a MBS BWP corresponding to a MBS-Timer that is still running, then the UE switches to the unicast initial/default BWP when this timer expires.

In one embodiment, a UE switches to the smallest BWP that contains the configured MBS BWPs upon expiry of the BWP-InactivityTimer of the associated unicast BWP.

In one embodiment if a MBS-Timer is not configured for the UE, or the timer is set to zero, the UE switches directly to the unicast initial/default BWP when the BWP-InactivityTimer expires.

In another embodiment, a MBS BWP may have a dedicated inactivity timer, denoted as MBS-BWP-InactivityTimer. Its value may be provided to the UE through higher-layer signaling, such as a RRC parameter as part of ServingCellConfig IE, or any new IE introduced to provide MBS configurations.

Starting/restarting a MBS-BWP-InactivityTimer may follow the same rules as a unicast BWP-InactivityTimer, but as it relates to MBS activities. For example, if a UE receives a MBS PDCCH on a MBS BWP or receives a configured MBS downlink assignment carrying MAC PDU or transmit MAC PDU in configured uplink grant for a MBS BWP, the UE starts/restarts the MBS-BWP-InactivityTimer.

Figure 17:
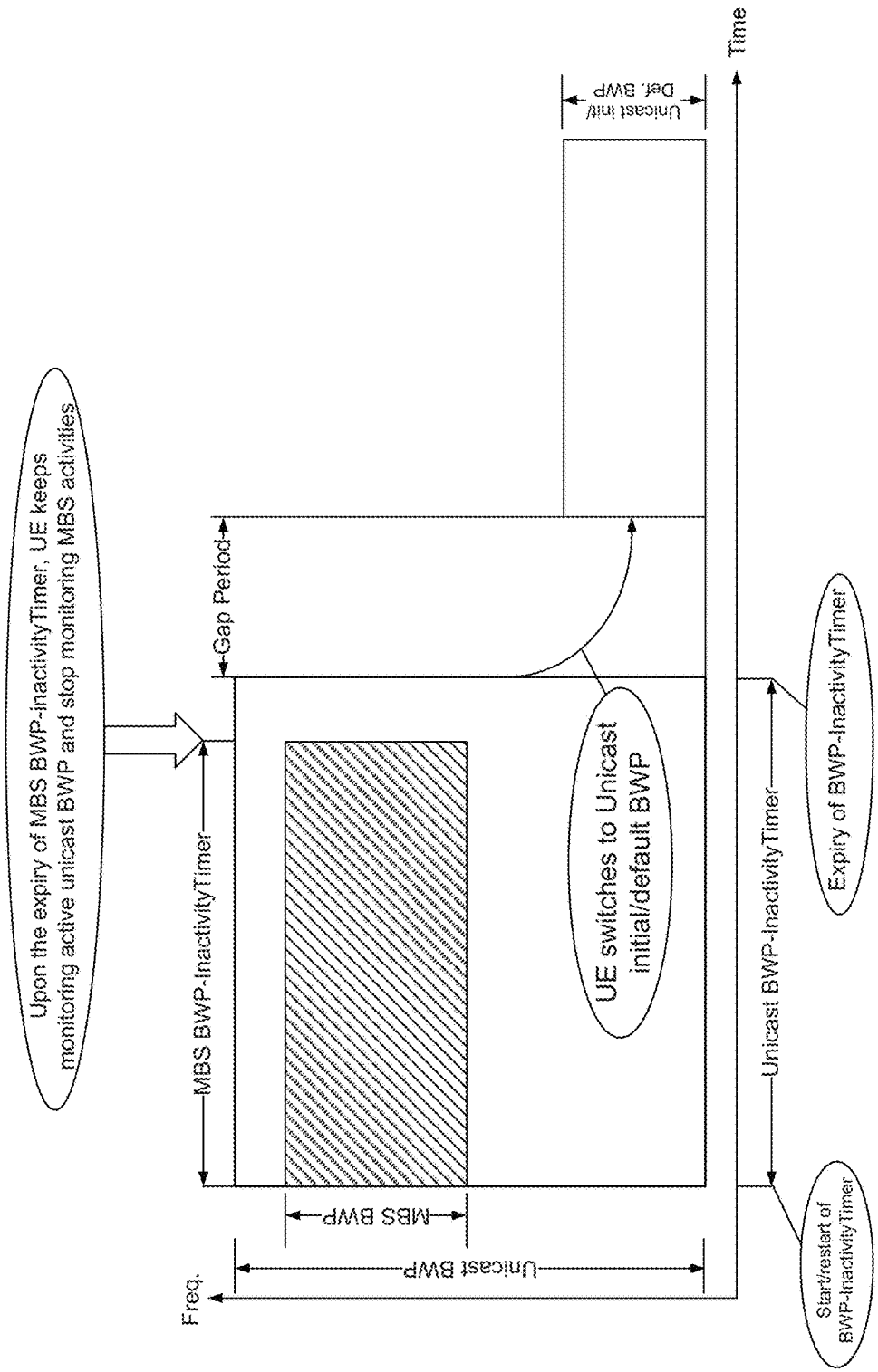
FIG. 17 depicts an example of UE behavior when a MBS-BWP-InactivityTimer expires while a unicast BWP-InactivityTimer is still running according to the subject matter disclosed herein.

If the MBS-BWP-InactivityTimer expires before the unicast BWP-InactivityTimer, a UE stops monitoring any MBS activities, but remains monitoring the unicast activities based on the provided configurations. In other words, a UE does not switch to the initial/default BWP upon expiry of the MBS-BWP-InactivityTimer if the unicast BWP-InactivityTimer is still running and has not expired. FIG. 17 depicts an example of UE behavior when a MBS-BWP-InactivityTimer expires while a unicast BWP-InactivityTimer is still running according to the subject matter disclosed herein. In the situation depicted in FIG. 17, the UE remains in an active unicast BWP. When the unicast BWP-InactivityTimer expires, the UE switches to the unicast initial/default BWP.

In one embodiment, a dedicated BWP inactivity timer may be configured for the MBS BWP. The value of an inactivity timer may be provided through higher-layer signaling. The value may also be derived from the value of an associated unicast BWP-InactivityTimer. If the unicast BWP-InactivityTimer expires while MBS-BWP-InactivityTimer is still running, one of the previously described embodiments may be applied and the functionalities of MBS-Timer may be realized with a MBS-BWP-InactivityTimer instead.

Also another embodiment, i.e., if a unicast BWP-InactivityTimer expires while a MBS-BWP-InactivityTimer is still running, a UE may still continue to monitor the active unicast BWP, not only the MBS BWP, until the expiry of the MBS-BWP-InactivityTimer. This may avoid any interruption of a transmission/reception on the MBS BWP. In other words, a UE may switch from the active unicast BWP to the unicast initial/default BWP when both timers expire, that is, when both the unicast BWP-InactivityTimer and the MBS-BWP-InactivityTimer expire.

Although in the previous examples, a focus has been on switching and the initial/default BWP and active unicast BWP, a similar procedure may be applied when the switching occurs between to BWPs and neither BWP is the initial/default BWP. This applies regardless whether a CFR is configured as a MBS region or as a MBS BWP.

For either the case in which a MBS CFR(s) may be defined as a MBS region of contiguous PRBs, or defined as a dedicated MBS BWP, some of configured unicast BWPs and/or the initial/default BWP may be associated with one or multiple CFRs. Upon switching from particular unicast BWP to another unicast BWP, e.g. a default unicast BWP, a UE is expected to stop monitoring one or more MBS CFRs in an old BWP and to switch to one or more MBS CFRs associated with a newly activated BWP.

Upon switching to a new BWP that is associated with multiple MBS CFRs, a UE may start monitoring one or a subset of the MBS CFRs. For example, a UE may monitor a MBS CFR having the smallest index ID until receiving further instructions from a gNB to start monitoring an additional MBS CFR.

To configure such an association, a gNB may provide a UE with a CFR identity, such as an ID of the CFR, that is associated with the configured BWP. For example, in a RRC IE BWP-Downlink, a gNB may provide a UE with ID(s) of the associated MBS CFRs through a RRC parameter, such as Associated-CFR, which may be a sequence of MBS CFR IDs. A maximum of the sequence may be predefined, provided in the specification, configured through higher-layer signaling, or the UE may indicates the maximum as part of the capabilities of the UE.

Also, the association may be realized implicitly. For example, if all PRBs of any particular MBS CFR is confined/contained with a BWP, then the CFR is associated with this BWP.

As there may be only one default BWP configured per cell having an ID provided in ServingCellConfig, identities of the MBS CFRs associated with the configured default BWP, or the initial BWP in general, may be provided as part of ServingCellConfig. For example, a gNB may use a RRC parameter, such as Associated-CFR, which may be a sequence of MBS CFR IDs. The maximum of this sequence may be predefined, provided in the specification, configured through higher-layer signaling, or the UE indicates the maximum as part of the capabilities of the UE.

A similar timeline may be applied to the aforementioned embodiments when a UE switches from a particular MBS CFR to another MBS CFR.

In one embodiment, when a UE switches to another BWP (due to timer expiry, or by explicit command from a gNB), the UE monitors the MBS CFR associated with the new BWP and stops monitoring the MBS CFR associated with the old BWP.

In one embodiment, an association between a MBS CFR(s) and a BWP may be realized either explicitly or implicitly.

RRC_Idle/Inactive UEs

A UE may be able receive multicast or broadcast while the UE is in an RRC_idle/inactive state. Monitoring of a MBS PDCCH may cause extra power consumption. Therefore, the following embodiments may be used to address the issue of extra power consumption, but may not be limited thereto.

A UE may be able receive multicast or broadcast while the UE is in an RRC_idle/inactive state. Monitoring of a MBS PDCCH may cause extra power consumption. Therefore, the following embodiments may be used to address the issue of extra power consumption, but may not be limited thereto.

A MBS CFR refers to a MBS-specific BWP or a MBS frequency region with a number of contiguous PRBs. Moreover, a MBS PDCCH refers to a PDCCH that is associated with MBS activities, such as a scheduling dynamic PDSCH for MBS, an activate/deactivate SPS PDSCH for MBS, etc.

Figure 18:
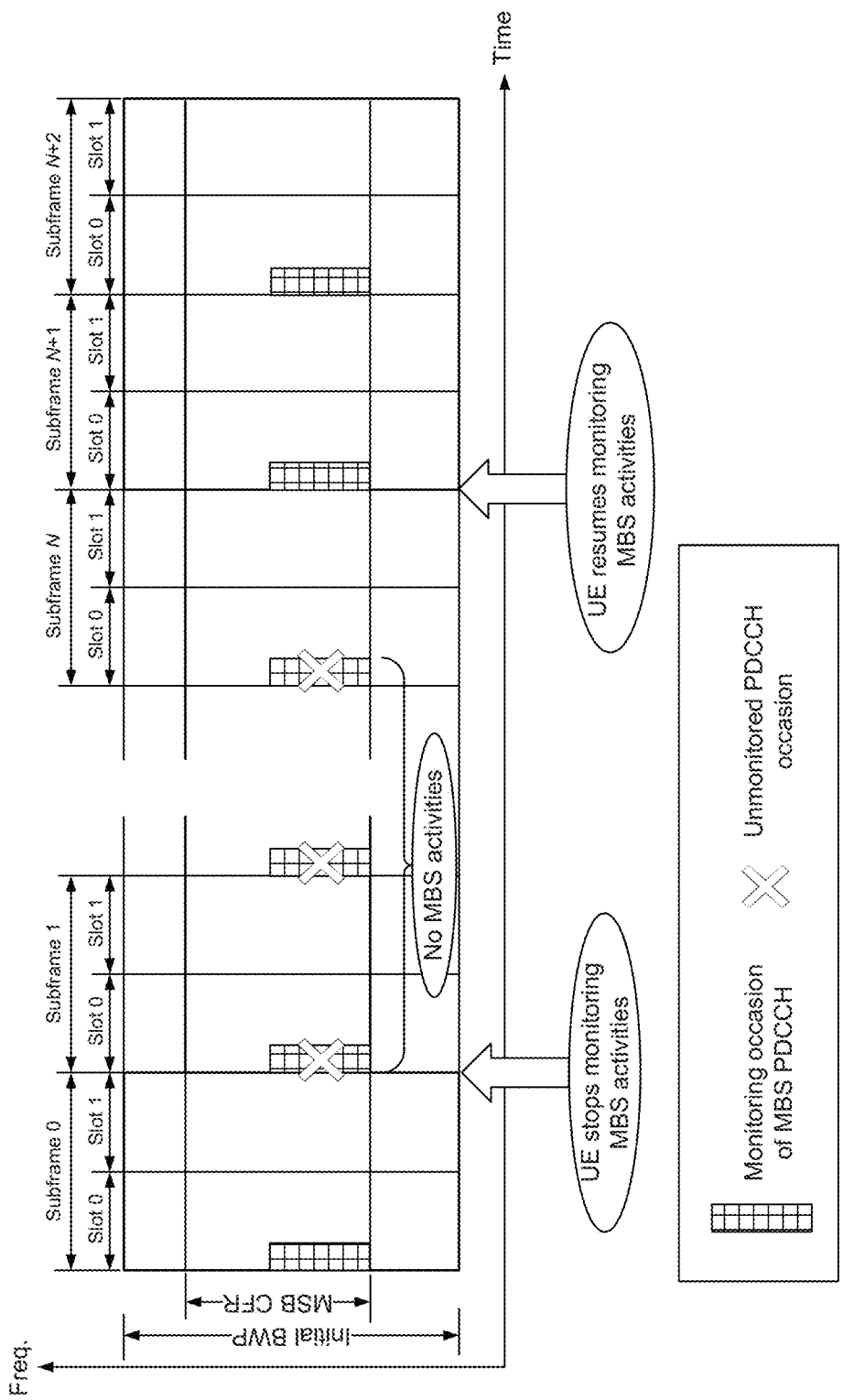
FIG. 18 depicts an example scenario in which a MBS CFR may be fully confined within an initial BWP of a RRC_idle/inactive UE and upon the absence of MBS activities, a UE remains in the initial BWP, but may stop monitoring a MBS PDCCH according to the subject matter disclosed herein.

FIG. 18 depicts an example scenario in which a MBS CFR may be fully confined within an initial BWP of a RRC_idle/inactive UE and upon the absence of MBS activities, a UE remains in the initial BWP, but may stop monitoring a MBS PDCCH according to the subject matter disclosed herein. When the UE determines no MBS activities, the UE may stop monitoring a MBS PDCCH and then resume after a certain period when MBS activities are resumed. The UE, however, remains in the initial BWP monitoring the legacy signals/channels, such as synchronization signal block (SSB), remaining system information (RMSI)-PDCCH, RMSI-PDSCH, paging, other system information (OSI), etc.

In one embodiment, a gNB may provide a UE with a MBS_inactivityTimer through higher-layer signaling as described in the aforementioned procedures when the UE is in RRC connected state. Once the UE switches an RRC idle/inactive state, the UE may use the values that were provided in the RRC connected state, unless new values are provided in a RRC idle/inactive state. Upon expiry of the timer, the UE may stop monitoring a MBS PDCCH using similar aforementioned procedures for RRC_connected UEs. For example, a UE may start/restart a timer after the reception of a MBS PDCCH, or a MBS PDSCH, or a unicast PDSCH as a retransmission of MBS PDSCH. Upon expiry of the timer, a UE may skip monitoring a MBS PDCCH.

In one embodiment, if a UE was provided with a MBS_inactivityTimer when the UE was in a RRC_connected state, the UE may apply this value when the UE switches RRC idle/inactive states, unless another value is provided in the RRC idle/inactive state.

In one embodiment, upon expiry of a MBS_inactivityTimer, a RRC idle_inactive UE may stop monitoring a MBS PDCCH, but remain in the initial BWP and monitor legacy signals/channels in the RRC state.

As another alternative, a gNB may provide RRC_idle/inactive UEs with the MBS_inactivityTimer value through higher-layer signaling, such as in a RMSI-PDSCH or an OSI-PDSCH. Also, a set of values may be predefined, i.e., provided in the specification, then a gNB may directly use the RMSI-PDCCH or the OSI-PDCCH, e.g., DCI format 1_0 with cyclic redundancy check (CRC) scrambled by system information-radio network temporary identifier (SI-RNTI) to indicate which value to apply without the need to use higher-layer signaling. In NR Rel. 16, there are 17 reserved bits DCI format 1_0 with CRC scrambled by SI-RNTI that may be used for this purpose.

In one embodiment, RMSI/OSI-PDCCH may indicate a value of the MBS_inactivityTimer from a set of predefined values. Or, a RMSI/OSI-PDCCH may directly provide the value of the MBS_inactivityTimer even if there are no predefined values in the specification.

In one embodiment, the reserved bits in RMSI/OSI-PDCCH may be used to indicate the value of the MBS_inactivityTimer.

Other embodiments developed for RRC_connected UEs, such as using the latest MBS-PDCCH, to explicitly indicate the absence of MBS activities and/or its duration may be applied for RRC_idle/inactive UEs. Moreover, a gNB may explicitly indicate an absence and/or a duration of an absence in a RMSI/OSI-PDCCH or a RMSI/OSI-PDSCH. For example, 1-bit field in a RMSI/OSI-PDCCH may indicate the absence/presence of MBS activities. Also, a RMSI/OSI PDSCH may be used to explicitly indicate the absence/presence of MBS activities and its duration. Moreover, a combination of a RMSI/OSI-PDCCH and a RMSI/OSI-PDSCH may be used to explicitly indicate the absence/presence of MBS activities and its duration. For example, a RMSI/OSI-PDCCH only indicate the absence/presence of MBSC activities, but that a RMSI/OSI-PDSCH indicate its duration.

In one embodiment, for a RRC_idle/inactive UE, a gNB may explicitly indicate the presence or absence of MBS activities and its duration in a RMSI/OSI-PDCCH and/or a RMSI/OSI-PDSCH.

To resume monitoring MBS activities in RRC_idle/inactive state, similar to the developed embodiments for RRC_connected UEs, if a UE is provided with the absence duration of MBS activities, a RRC_idle/inactive UE may resume monitoring MBS activities at the end of the indicated duration.

Alternatively, a gNB may explicitly indicate to a RRC_idle/inactive UE to resume monitoring through a PDCCH or a PDSCH of RMSI/OSI. Moreover, the gNB may use paging to indicate to the UE to resume monitoring MBS activities. For example, a 1-bit field in a paging PDCCH may be used to indicate the resumption of MBS activities and, hence, a RRC_idle/inactive UE resumes monitoring MBS PDCCH. To this end, one the eight (8) reserved bits in DCI format 1_0 may be used with CRC scrambled by a paging-radio network temporary identifier (P-RNTI). Note that it may be straight forward to use a paging PDCCH to indicate the absence of MBS activities and its duration as well.

In one embodiment, to resume monitoring MBS activities, a gNB may provide an indication of the resumption of MBS activities in RMSI or paging.

In one embodiment, the reserved bits of a RMSI/OSI-PDCCH or a paging PDCCH may be used to carry the resumption indication of MBS activities.

To further provide additional flexibility to a gNB to indicate the absence/resumption of MBS activities to a particular UE rather than broadcast such an indication to all UEs in a cell, the following embodiments may be used.

As one embodiment, a gNB may use a 1-bit field, e.g. called MBS-status, in a paging PDCCH combined with a paging message to indicate to a particular UE the status of MBS activities. For example, if a RRC_idle/inactive UE detects a paging PDCCH with MBS-status set to 1 and finds the ID of the UE in the paging message, the UE may assume there is MBS activities and a MBS PDCCH should be monitored. On the other hand, if MBS-status set to 0 and the UE finds the ID of the UE in the paging message, the UE may interpret it as a legacy paging indication and conduct the associated procedure, such as initiating RACH, etc. One of the reserved bits in the paging DCI may be used to carry MBS-status.

Alternatively, if a RRC_idle/inactive UE detects a paging PDCCH with the MBS-status set to 1 and finds the ID of the UE in the paging message, the UE assumes there is no MBS activities and a MBS PDCCH should not be monitored. On the other hand, if the MBS-status is set to 0 and the UE finds the ID of the UE in the paging message, the UE may interpret it as a legacy paging indication and conduct the associated procedure, such as initiating RACH, etc.

Moreover, MSB-status may have more than one bit to enable a gNB to indicate how RRC_idle/inactive UEs may interpret the reception of a paging message with their ID included in the paging message. Table 2 shows an example of possible UE behaviors when the paging message includes an ID of a UE.

MBS-status field indicates how the UE should interpret the paging message. The paging message may carry the MSB ID. In this case, all RRC_idle/inactive UEs that receive the paging PDCCH with MBS-status field, for example, will resume/start/stop monitoring the MBS activity having an ID that is provided in the paging message. If no MBS ID is provided in the paging message, the RRC_idle/inactive UE may resume/start/stop monitoring all MBS activates.

Figure 19:
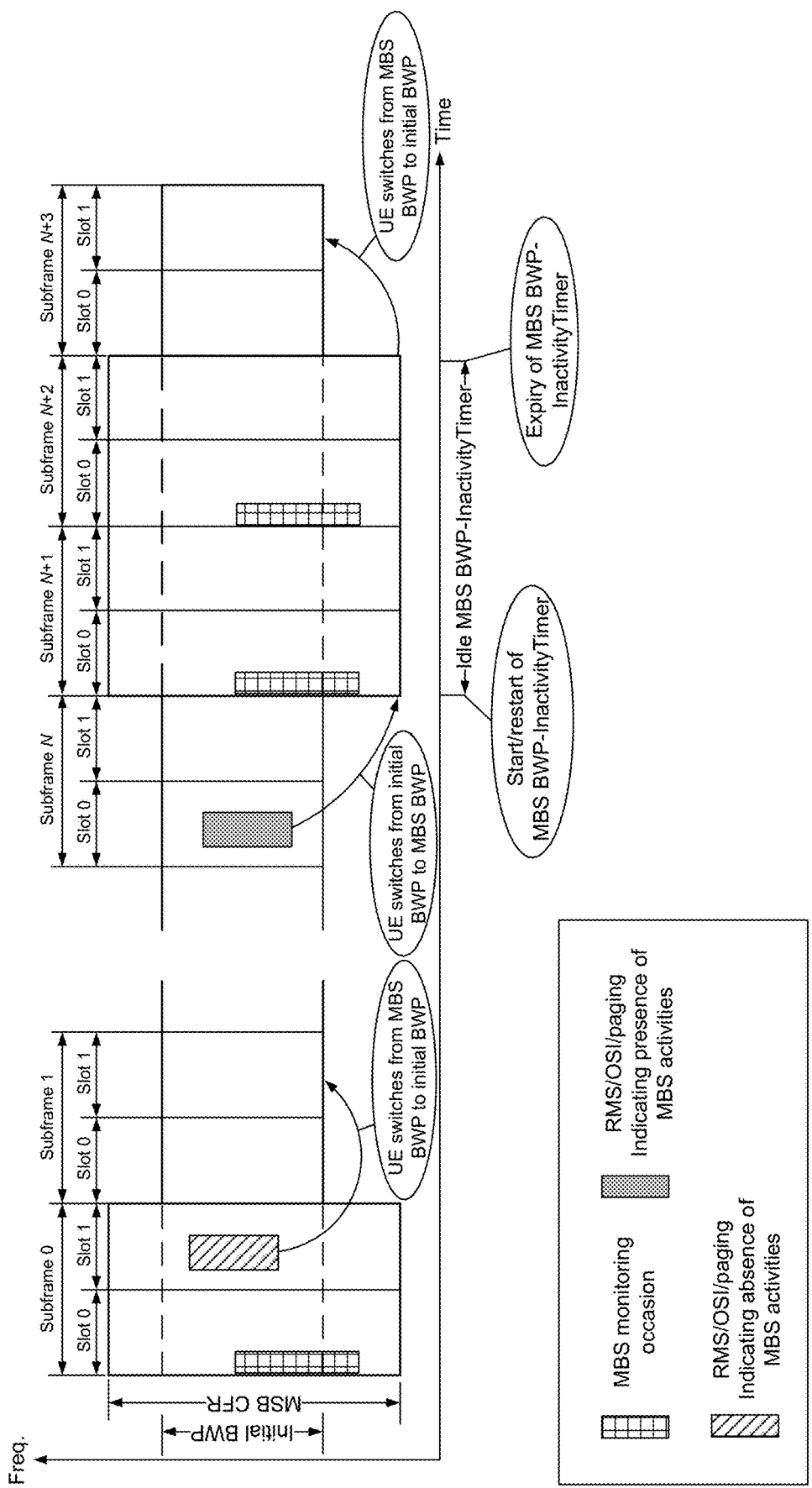
FIG. 19 depicts an example of an RRC_idle/inactive UE in a MBS BWP that receives an indication of an absence of MBS activities through a RMSI, OSI, a paging, or any other indications in which the RRC_idle/inactive UE switches to the initial BWP according to the subject matter disclosed herein.

In other situations, a MBS CFR(s) may have bandwidth wider than the initial BWP. FIG. 19 depicts an example of an RRC_idle/inactive UE in a MBS BWP that receives an indication of an absence of MBS activities through a RMSI, OSI, a paging, or any other indications in which the RRC_idle/inactive UE switches to the initial BWP according to the subject matter disclosed herein. In such situations, if the RRC_idle/inactive UE may switch to a narrow initial BWP when there is no MBS activities in a wider MBS BWP.

To this end, a gNB may provide a UE with an Idle-MBS-BWP-InactivityTimer through higher-layer signaling, such as a RRC parameter. A gNB may provide such a configuration when a UE is in a RRC_connected state and then uses the configuration when the UE is in a RRC idle/inactive state. Alternatively, a gNB may provide such a configuration

TABLE 2

Example UE behavior when MBS-status is a two-bit field.

| MBS-status field | Interpretation of the presence of UE ID in the paging message |
|---|---|
| 00 | Legacy paging behavior is expected with no information about MBS activities |
| 01 | Indication of the presence of MSB activities, but UE is not expected to conduct any legacy behavior when UE's ID is found in the paging message |
| 10 | Indication of the absence of MSB activities, but UE is not expected to conduct any legacy behavior when UE's ID is found in the paging message |
| 11 | Indication of the presence of MSB activities and UE is expected to conduct any legacy behavior when UE's ID is found in the paging message |

As yet another possibility, a 2-bit field may be interpreted as shown in Table 3.

TABLE 3

Example UE behavior when MBS-status is two-bit field in which only a presence of MBS activates may be indicated.

| MBS-status field | Interpretation of the presence of UE ID in the paging message |
|---|---|
| 00 | Legacy paging behavior is expected with no information about MBS activities |
| 01 | Indication of the presence of MSB activities, but UE is not expected to conduct any legacy behavior when UE's ID is found in the paging message |
| 10 | Indication of the presence of MSB activities and UE is expected to conduct any legacy behavior when UE's ID is found in the paging message |
| 11 | Reserved |

In one embodiment, a paging PDCCH and/or a paging message may be used to indicate the status of MBS activities for a particular UE.

The presence of a MSB-status field in a paging PDCCH may be indicated through higher-layer signaling such as RMSI/OSI. If not configured, a RRC_idle/inactive UE interprets paging according to a legacy UE behavior. If configured, then the disclosed interpretation may be applied.

In one embodiment, a presence/absence of MBS-status field may be indicated through higher-layer signaling, such as RMSI/OSI.

Although in the aforementioned embodiments, it is assumed that paging message carries the ID of a UE and the through a RMSI or an OSI. If not provided, a UE may assume that the value of the Idle-MBS-BWP-Inactivity-Timer is as same as the value of the MBS-BWP-Inactivity-Timer for the UE when it is in RRC connected state, if provided, or as same as the unicast BWP-InactivityTimer, if provided. Also, the value of the Idle-MBS-BWP-Inactivity-Timer may derived according to certain rules from the value of MBS-BWP-InactivityTimer or the unicast MBS-Inactivi-tyTimer, if provided. For example, a simple scaling factor may applied and the scaling coefficient may be either predefined, provided in the specification, or configured through higher-layer signaling.

A RRC-Idle/inactive UE may start/restart Idle-MBS-BWP-InactivityTimer using one of the aforementioned embodiment for RRC_connected UEs.

Additionally, reception RMSI, OSI or paging indicating the presence/absence of MBS activities may trigger a BWP switching between an initial BWP and a MBS BWP. For example, if a UE is in an initial BWP and receives a RMSI, OSI, or a paging, for example, indicating the presence of MBS activities using one of the aforementioned procedures or any other procedure, the UE may be expected to switch from the initial BWP to a MBS BWP. On the other hand, if a UE is in a MBS BWP and receives indication of the absence of MBS activities through a RMSI, an OSI, or a paging, for example, using one of the aforementioned procedures or any other procedure, a RRC_idle/inactive UE switches from the MBS BWP to the initial BWP.

Later, the UE receives an indication of the presence of MBS activities through a RMSI, an OSI, or a paging, for example, then the RRC_idle/inactive UE switches to a MBS BWP and resumes the monitoring of the MBS PDCCH. After that, the Idle-MBS-BWP-InactivityTimer expires, which triggers switching from a MBS BWP to the initial BWP.

In one embodiment, a RRC_idle/inactive UE switches from a wider MBS BWP to an initial BWP when there are no MBS activities.

In another embodiment, a RRC_idle/inactive UE may determine an absence of MBS activities by expiry of a Idle-MBS-BWP-InactivityTimer or through an explicit indication.

In one embodiment, a value of an Idle-MBS-BWP-InactivityTimer may be explicitly indicated through a RMSI/OSI or derived from a value of an Idle-MBS-BWP-Inactivity-Timer or the unicast BWP-InactivityTimer.

Although in the previous examples, a RRC_idle/inactive UE switches immediately between an initial BWP and a MBS BWP, in general, a gap period may be used for any BWP switching operation in which a UE is not able to receive or transmit. Procedures that are similar to the procedures developed for RRC_connected UEs may be applied to define/introduce gap period during switching between a MBS BWP and an initial BWP.

In one embodiment, for a RRC_idle/inactive UE, a time gap when switching between a MBS BWP and an initial BWP may be applied.

UE Monitoring Capability and Overbooking

In NR Rel. 15/16, a maximum number of monitored PDCCH candidates and a maximum number non-overlapped CCEs may be defined per slot/span for a DL BWP for a serving cell. Moreover, it has been agreed keep the definitions per slot unchanged for MBS. Although no agreements were yet reached for the definitions per span yet, if needed, definitions per span may most likely follow the same definitions as in NR Rel. 16.

Currently, counted PDCCH candidates may be transmitted within an active BWP based on the provided SS and CORESET configurations. Given that a CFR may be considered as a separate MBS BWP confined within an associated unicast BWP, the monitored MBS PDCCH within a CFR should be counted for monitoring of the associated unicast BWP. Similar counting rules to the rules in Clause 10.1 in 3GPP TS 38.213: "Physical layer procedures for control", Rel. 16, V16.4.0 may be applied. The same may be applied when a CFR is configured as a MBS frequency region of contiguous PRBs within the associated unicast BWP.

In one embodiment, for a CFR defined as dedicated a MBS BWP or a MBS frequency region, monitored MBS PDCCH candidates may be counted towards the PDCCH candidate budget of the associated unicast BWP.

In one embodiment, a same approach may be extended to a non-overlapped CCEs budget.

Using any of the aforementioned procedures or any other procedures, a UE may stop monitoring a MBS PDCCH when there are no MBS activities. However, the configured MBS PDCCH monitoring candidate, or non-overlapped CCEs may still be counted towards the corresponding budgets of the associated unicast BWP, even if the UE does not monitor them. This may avoid any misalignment between a gNB and a UE.

In one embodiment, even if a UE stops monitoring a MBS PDCCH, the configured MBS PDCCH candidates and non-overlapped CCEs may still be counted towards the maximum number of the monitored PDCCH candidates and non-overlapped CCEs, respectively, of the associated unicast BWP.

As yet another embodiment, if a UE stops monitoring a MBS PDCCH, the UE may not count the unmonitored MBS PDCCH and their associated non-overlapping CCEs towards the maximum number of the monitored PDCCH candidates and non-overlapped CCEs, respectively, of the associated unicast BWP. This efficiently utilizes the available resources at the UE, in terms of the budget of PDCCH candidates and non-overlapping CCEs.

In one embodiment, if a UE stops monitoring a MBS PDCCH, the configured MBS PDCCH candidates and non-overlapped CCEs may not be counted towards the maximum number of the monitored PDCCH candidates and non-overlapped CCEs, respectively, of the associated unicast BWP.

Although not counting the unmonitored MBS PDCCH and the associated non-overlapped CCEs for monitoring may be beneficial, it is necessary that a gNB and a UE are aligned most of the time. For example, the chance of missing any PDCCH should be very low and it may be less likely that any misalignment may occur between a UE and a gNB. Therefore, capable UEs may indicate such capability, i.e., the support of not counting the unmonitored MBS PDCCH and the associated non-overlapped CCEs for monitoring may be indicated by a UE capability. For example, setting a RRC parameter, such as Uncounting_MBS_PDCCH, to true, means that when a UE stops monitoring a MBS PDCCH, the UE may not consider the MBS PDCCH towards the budget of PDCCH candidate monitoring and non-overlapped CCEs of the associated unicast BWP. Hence, a gNB may use such resources to schedule other PDCCHs. On the other hand, if Uncounting_MBS_PDCCH is set to false, then all the configured MBS PDCCH and the associated non-overlapped CCEs may be counted towards the UE budget regardless whether the UE monitors them or not.

In one embodiment, UE capability may be added to indicate support of not counting the unmonitored MBS PDCCH towards the budget of the for PDCCH candidate and non-overlapped CCEs or not.

Even if a UE indicates the support of such capability, a gNB may indicate whether the gNB intends to use such capability (transmit other PDCCHs when UE stops monitoring MBS PDCCH) or not. For example, if a gNB indicates to the UE that such capability is not needed, and when UE stops monitoring MBS PDCCH, the UE may not to attempt decoding any PDCCHs as replacement of the unmonitored MBS PDCCH which can reduce power consumption. To this end, the gNB may configure the UE through higher-layer signaling, such as the RRC parameter MBS_PDCCH_Replacement, to indicate whether the UE should expect replacement of the unmonitored MBS PDCCH or not.

In one embodiment, a gNB may configure a UE through higher-layer signaling to indicate whether the UE should expect replacement of the unmonitored MBS PDCCH or not.

In NR Rel. 15/16, RRC_idle/inactive UEs may be expected to only monitor GC-PDCCH, such as a RMSI/OSI-PDCCH and a paging-PDCCH, for example. A MBS UE, however, may be expected to monitor an additional PDCCH to support MBS activities. Therefore, a maximum limit on PDCCH candidate and the associated non-overlapped CCEs may be defined that UE is expected to monitor in the initial BWP or the CFR in a slot/span. Similar PDCCH dropping rules defined for RRC_connected UEs, when overbooking occurs, may be applied for RRC_idle/inactive UEs. In one embodiment, the maximum number of PDCCH candidates and non-overlapped CCEs may be defined for RRC_idle/inactive UEs.

In NR Rel. 15/16, a UE may not expect overbooking on SCell and it is a responsibility of a gNB to ensure that the maximum UE budget in terms of PDCCH candidates and non-overlapped CCEs is not exceeded. Due to the extra PDCCHs that a UE may be expected to monitor, overbooking may occur for a SCell when the cell may be configured with a MBS, as well. In this case, similar PDCCH dropping rules for a SPcell in Clause 10.1 in 3GPP TS 38.213: "Physical layer procedures for control", Rel. 16, V16.4.0 may be applied.

To keep UE complexity at reasonable level, only one cell in CA/DC may be overbooked. Moreover, if any cell other than SPCell is overbooked, a UE may not expect that a SPCell may be overbooked as well. To this end, a gNB may explicitly indicate the index of the cell through higher-layer signaling. For example, as part of ScellConfig or SpcellConfig IE, a gNB may provide a UE with a RRC parameter, such as Overbooking_status. If the parameter is set true, then a UE assumes that overbooking is supported in this cell. If the parameter is set to false, or not provided, a UE assumes overbooking is not supported for a SCell.

Alternatively, through a capability report, a UE may indicate to a gNB how many cells the UE may support with overbooking. For example, higher-layer signaling, such as the RRC parameter number_overbooking_cells, may be used to indicate such information. Also, additional constraints may be applied, such as the overbooking for SCell or more than one cells, may be applied only for intra band CA, for example.

As yet another embodiment, overbooking for SPCell may not be allowed when a MBS is configured. A motivation may be uncertainty (misalignment between a gNB and a UE) of limits due to stopping monitoring of a MBS, and overbooking and dropping behavior involves tighter alignment in understanding. If overbooking is not allowed for a PCell, one SCell may be overbooked.

In one embodiment, overbooking support for a SCell may occur when the SCell is configured with MBS. In one embodiment, only one cell in CA supports overbooking. In one embodiment, through capability signaling, a UE may indicate its capability for supporting more than one cell with overbooking feature.

Figure 20:
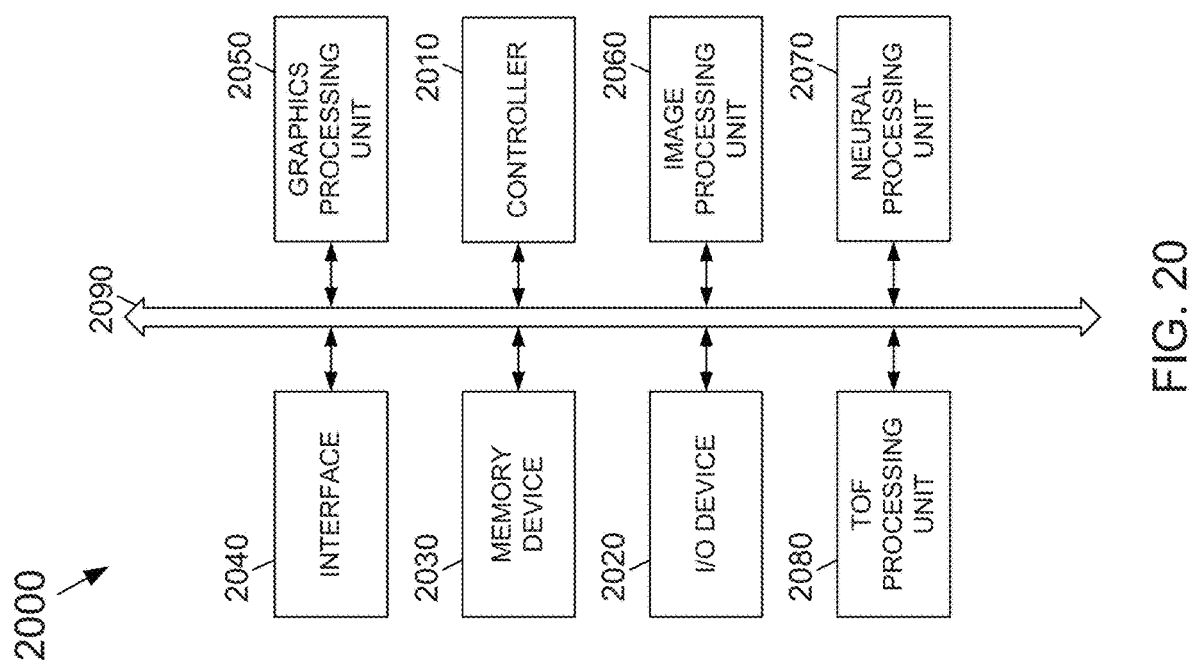
FIG. 20 depicts an electronic device that includes a capability to selectively receive MBS communications in a CFR to reduce a monitored frequency bandwidth, or a combination thereof, to reduce a power consumption of the device according to the subject matter disclosed herein.

FIG. 20 depicts an electronic device 2000 that includes a capability to selectively receive MBS communications in a CFR to reduce a monitored frequency bandwidth, or a combination thereof, to reduce a power consumption of the device according to the subject matter disclosed herein. In one example embodiment, the electronic device 2000 may be configured as a UE. In another example embodiment, the electronic device 2000 may be configured as a gNB. Electronic device 2000 and the various system components of electronic device 2000 may be formed from one or modules that individually or collectively perform the functionality disclosed herein to selectively receive MBS communications in a CFR to reduce a monitored frequency bandwidth, or a combination thereof, to reduce a power consumption of the device according to the subject matter disclosed herein.

The electronic device 2000 may include a controller (or CPU) 2010, an input/output device 2020 such as, but not limited to, a keypad, a keyboard, a display, a touch-screen display, a 2D image sensor, a 3D image sensor, a memory 2030, an interface 2040, a GPU 2050, an imaging-processing unit 2060, a neural processing unit 2070, a TOF processing unit 2080 that are coupled to each other through a bus 2090. The controller 2010 may include, for example, at least one microprocessor, at least one digital signal processor, at least one microcontroller, or the like. The memory 2030 may be configured to store a command code to be used by the controller 2010 and/or to store a user data. In one embodiment, the controller 2010 may configure and control the neural processing unit 2070.

The interface 2040 may be configured to include a wireless interface that is configured to transmit data to or receive data from, for example, a wireless communication network using a RF signal. The wireless interface 2040 may include, for example, an antenna. In one embodiment, the controller 2010 may control the interface 2040 to receive unicast communications in a BWP of a wireless communication network and to receive MBS communications in a CFR of the wireless communications, and control the interface 2040 to selectively receive the MBS communications in the CFR, to reduce a monitored frequency bandwidth, or a combination thereof. The controller 2010 may be configured to respond to conditions that are detected and/or to communications received from, for example, a gNB, to perform the functionality disclosed herein.

The electronic system 2000 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A device comprising:
an interface to a wireless communication network, the interface being configured to receive wireless communications from the wireless communication network; and
a controller configured to control the interface to receive unicast communications in a bandwidth part (BWP) of the wireless communication network and to receive communications in a common frequency resource (CFR) of the wireless communications and to continue receiving communications in an active unicast BWP based on the presence of the CFR of the wireless communications in the active unicast BWP;
further comprising a first timer configured to start based on a reception by the interface of one of a unicast physical downlink control channel (PDCCH), a first PDCCH, or a first Medium Access Control (MAC) Protocol Data Unit (PDU) received in a configured downlink assignment, and
wherein while the first timer is running, the first timer is further configured to restart based on a reception by the interface of a second PDCCH, or second MAC PDU received in a configured downlink assignment for before a first predetermined period of time ends, and
wherein continuing receiving communications in an active unicast BWP based on the presence of the CFR of the wireless communications in the active unicast BWP comprises continuing receiving communications in the active unicast BWP while the first timer is running.

2. The device of claim 1, wherein the controller is further configured to control the interface to receive communications in the CFR to reduce a frequency bandwidth of the interface.

3. The device of claim 1, wherein the controller further controls the interface to reduce a frequency bandwidth of the interface to be a default/initial BWP based on the first predetermined period of time ending.

4. The device of claim 1, wherein the PDCCH comprises a Group Common-Physical Downlink Control Channel (GC-PDCCH) scrambled by a Group-Radio Network Temporary Identifier (G-RNTI) for dynamic scheduling a Physical Downlink Shared Channel (PDSCH), or a GC-PDCCH scrambled by a Group-Configured Scheduling-Radio Network Temporary Identifier (G-CS-RNTI) for activation/deactivation of a Semi-Persistent Scheduling (SPS) PDSCH.

5. The device of claim 1, wherein the controller further controls the interface to stop monitoring communications after a predetermined period without receiving a communication or based on a reception by the interface of an explicit indication of an absence of activity received in one of a device-specific PDCCH or a group common PDCCH.

6. The device of claim 1, wherein based on the device being in a state in which monitoring communication activity has stopped, the controller is further configured to control the interface to resume monitoring communication activity after a predetermined period of time based on a reception by the interface of an indication of a predetermined skipping period of time, an indication in a device-specific PDCCH, or a group common PDCCH.

7. The device of claim 1, wherein the CFR is contained within a unicast default/initial BWP, and
wherein the controller is further configured to control the interface to resume monitoring communication activity in the CFR based on the interface switching from a wide bandwidth to the unicast default/initial BWP.

8. The device of claim 1, wherein when the controller controls the interface to stop monitoring the Physical Downlink Control Channel (PDCCH), the PDCCH is continued to be counted toward a Blind Decode/Control Channel Elements (BD/CCEs) budget for the device.

9. The device of claim 1, wherein when the controller controls the interface to stop monitoring the PDCCH, the PDCCH is excluded from a count toward a Blind Decode/Control Channel Elements (BD/CCEs) budget for the device.

10. A method in a wireless communication network, the method comprising:
receiving, by an interface of a device to the wireless communication network, wireless communications from the wireless communication network;
controlling the interface, by a controller of the device, to receive unicast communications in a bandwidth part (BWP) of the wireless communication network and to receive communications in a common frequency resource (CFR) of the wireless communications to reduce a power consumption of the device using bandwidth adjustment based on presence of service activity and to continue receiving communications in an active unicast BWP based on the presence of the CFR of the wireless communications in the active unicast BWP;
starting a first timer based on a reception by the interface of one of a unicast physical downlink control channel (PDCCH), a first PDCCH or a first Medium Access Control (MAC) Protocol Data Unit (PDU) received in a configured downlink assignment; and
restarting the first timer while the first timer is running based on a reception by the interface of a second PDCCH or a second MAC PDU received in a configured downlink assignment for before a first predetermined period of time ends,
wherein controlling the interface to continue receiving communications in an active unicast BWP based on the presence of the CFR of the wireless communications in the active unicast BWP comprises controlling the interface to continue receiving communications in the active unicast BWP while the first timer is running.

11. The method of claim 10, further comprising controlling the interface, by the controller, to receive communications in the CFR to reduce a frequency bandwidth of the interface.

12. The method of claim 10, further comprising controlling the interface, by the controller, to reduce a frequency bandwidth of the interface to be a default/initial BWP based on the first predetermined period of time ending.

13. The method of claim 10, wherein the PDCCH comprises a Group Common-Physical Downlink Control Channel (GC-PDCCH) scrambled by a Group-Radio Network Temporary Identifier (G-RNTI) for dynamic scheduling a Physical Downlink Shared Channel (PDSCH), or a GC-PDCCH scrambled by a Group-Configured Scheduling-Radio Network Temporary Identifier (G-CS-RNTI) for activation/deactivation of a Semi-Persistent Scheduling (SPS) PDSCH.

14. The method of claim 10, further comprising controlling the interface, by the controller, to stop monitoring communications after a predetermined period of time without communication or based on a reception by the interface of an explicit indication of an absence of communication activity received in one of a device-specific PDCCH or a group common PDCCH.

15. The method of claim 10, further comprising controlling the interface, by the controller, to resume monitoring communication activity after a predetermined period of time based on a reception by the interface of an indication of a predetermined skipping period of time, an indication in a device-specific PDCCH, or a group common PDCCH, and based on the device being in a state in which monitoring communication activity has stopped.

16. The method of claim 10, wherein the CFR is contained within a unicast default/initial BWP,
the method further comprising controlling the interface, by the controller, to resume monitoring communication activity in the CFR based on the interface switching from a wide bandwidth to the unicast default/initial BWP.

17. The method of claim 10, further comprising:
controlling the interface, by the controller, to stop monitoring the PDCCH; and
continuing to count the PDCCH toward a Blind Decode/Control Channel Elements (BD/CCEs) budget for the device.

18. The method of claim 10, further comprising:
controlling the interface, by the controller, to stop monitoring the PDCCH; and
excluding the PDCCH from a count toward a Blind Decode/Control Channel Elements (BD/CCEs) budget for the device.

* * * * *